United States Patent
Lasserre et al.

(10) Patent No.: US 11,019,363 B2
(45) Date of Patent: May 25, 2021

(54) METHOD AND DEVICE FOR ENCODING A POINT CLOUD

(71) Applicant: INTERDIGITAL VC HOLDINGS, INC., Wilmington, DE (US)

(72) Inventors: Sebastien Lasserre, Thorigné Fouillard (FR); Jean-Claude Chevet, Cesson-Sevigne (FR); Yannick Olivier, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/630,549

(22) PCT Filed: Jul. 9, 2018

(86) PCT No.: PCT/EP2018/068494
§ 371 (c)(1),
(2) Date: Jan. 13, 2020

(87) PCT Pub. No.: WO2019/011834
PCT Pub. Date: Jan. 17, 2019

(65) Prior Publication Data
US 2020/0252647 A1    Aug. 6, 2020

(30) Foreign Application Priority Data

Jul. 13, 2017   (EP) .................................... 17305933

(51) Int. Cl.
*H04N 19/597*   (2014.01)
*G06T 9/00*     (2006.01)

(52) U.S. Cl.
CPC ............. *H04N 19/597* (2014.11); *G06T 9/00* (2013.01)

(58) Field of Classification Search
CPC .............................. G06T 9/00; H04N 19/597
See application file for complete search history.

(56) References Cited

U.S. PATENT DOCUMENTS

| 7,003,136 | B1  | 2/2006  | Harville |
|-----------|-----|---------|----------|
| 7,450,132 | B2 *| 11/2008 | Park .................... G06T 15/04 345/582 |

(Continued)

FOREIGN PATENT DOCUMENTS

| EP | 1321894 A2 * | 6/2003  | ........... G06T 15/205 |
| EP | 3293702 A1 * | 3/2018  | ............... G06T 9/40 |
| EP | 3418976 A1 * | 12/2018 | ............. H04N 19/96 |

OTHER PUBLICATIONS

Shi et al., "View-Dependent Real-Time 3D Video Compression for Mobile Devices", 16th International Conference on Multimedia 2008 (MM'08), Vancouver, British Columbia, Canada, Oct. 26, 2008, 4 pages.

(Continued)

*Primary Examiner* — Francis Geroleo
(74) *Attorney, Agent, or Firm* — Invention Mine LLC

(57) ABSTRACT

Method and device for encoding a point cloud that represents a three-dimensional (3D) object. One or more groups of temporally successive pictures are obtained. Each picture of the one or more groups comprises a first set of images, the images being spatially arranged in a same manner in each picture of the one or more groups. A second set of projections is associated with the one or more groups, a unique projection being associated with each image in such a way that a same projection is associated with only one single image and all projections are associated with the images. A first information representative of the projections is encoded. The point cloud may then be encoded according to the obtained pictures. A corresponding method and device for decoding a bitstream that comprises data representative of the encoded picture(s) are also described.

24 Claims, 9 Drawing Sheets

(56) References Cited

U.S. PATENT DOCUMENTS

| | | | | |
|---|---|---|---|---|
| 7,796,127 | B2* | 9/2010 | Lee | G06T 15/00 345/419 |
| 9,530,225 | B1* | 12/2016 | Nieves | G06T 9/001 |
| 9,641,822 | B2* | 5/2017 | Sim | H04N 13/111 |
| 10,223,810 | B2* | 3/2019 | Chou | H04N 19/54 |
| 10,694,210 | B2* | 6/2020 | Chou | H04N 19/96 |
| 2003/0214502 | A1* | 11/2003 | Park | G06T 17/005 345/420 |
| 2017/0094262 | A1 | 3/2017 | Peterson et al. | |
| 2017/0214943 | A1* | 7/2017 | Cohen | G06T 9/00 |
| 2018/0268570 | A1* | 9/2018 | Budagavi | G06T 9/001 |
| 2019/0082178 | A1* | 3/2019 | Kim | H04N 19/70 |
| 2019/0108656 | A1* | 4/2019 | Sugio | G06T 15/08 |

OTHER PUBLICATIONS

Ainala et al., "An Improved Enhancement Layer for Octree Based Point Cloud Compression with Plane Projection Approximation", SPIE Optical Engineering & Applications, San Diego, California, USA, Sep. 27, 2016, 9 pages.

Kammerl et al., "Real-time Compression of Point Cloud Streams", 2012 IEEE International Conference on Robotics and Automation, Saint Paul, Minnesota, USA, May 14, 2012, pp. 778-785.

Anonymous, "Advanced Video Coding for Generic Audiovisual Services", Series H: Audiovisual and Multimedia Systems, Infrastructure of Audiovisual Services—Coding of Moving Video, Recommendation ITU-T H.264 Standard, Telecommunication Standardization Sector of ITU, Mar. 2010, pp. 1-676.

Anonymous, "Current Status on Point Cloud Compression", International Organization on Standardization, ISO/IEC JTC1/SC29/WG11, Coding of Moving Pictures and Audio, ISO/IEC JTC1/SC29/WG11 N15869, Geneva, Switzerland, Oct. 2015, 11 pages.

Daribo et al., "Efficient Rate-Distortion Compression of Dynamic Point Cloud for Grid-Pattern-Based 3D Scanning Systems", 3D Research, vol. 3, No. 1, Mar. 2012, 9 pages.

Sattler et al., "Simple and Efficient Compression of Animation Sequences", Eurographics/ACM SIGGRAPH Symposium on Computer Animation (2005), Los Angeles, California, USA, Jul. 29, 2005, pp. 209-217.

Lasserre, S., "Point Cloud Compression Presentation to the Video Groups", International Organization on Standardization, ISO/IEC JTC1/SC29/WG11, Coding of Moving Pictures and Audio, ISO/IEC JTC1/SC29/WG11 MPEG2017/m40715, Hobart, Australia, Apr. 2017, 20 pages.

Anonymous, "High Efficiency Video Coding", Series H: Audiovisual and Multimedia Systems, Infrastructure of Audiovisual Services—Coding of Moving Video, Recommendation ITU-T H.265 Standard, Telecommunication Standardization Sector of ITU, Dec. 2016, pp. 1-664.

Anonymous, "Information Technology—Digital Compression and Coding of Continuous-Tone Still Images—Requirements and Guidelines", International Telegraph and Telephone Consultative Committee (CCITT), Terminal Equipment and Protocols for Telematic Services, Recommendation T.81, Sep. 1992, 186 pages.

Grau et al., "Frame-To-Frame Coherent GPU Splatting", IADIS International Conference Computer Graphics and Visualization 2008, Amsterdam, The Netherlands, Jul. 22, 2008, pp. 27-35.

* cited by examiner

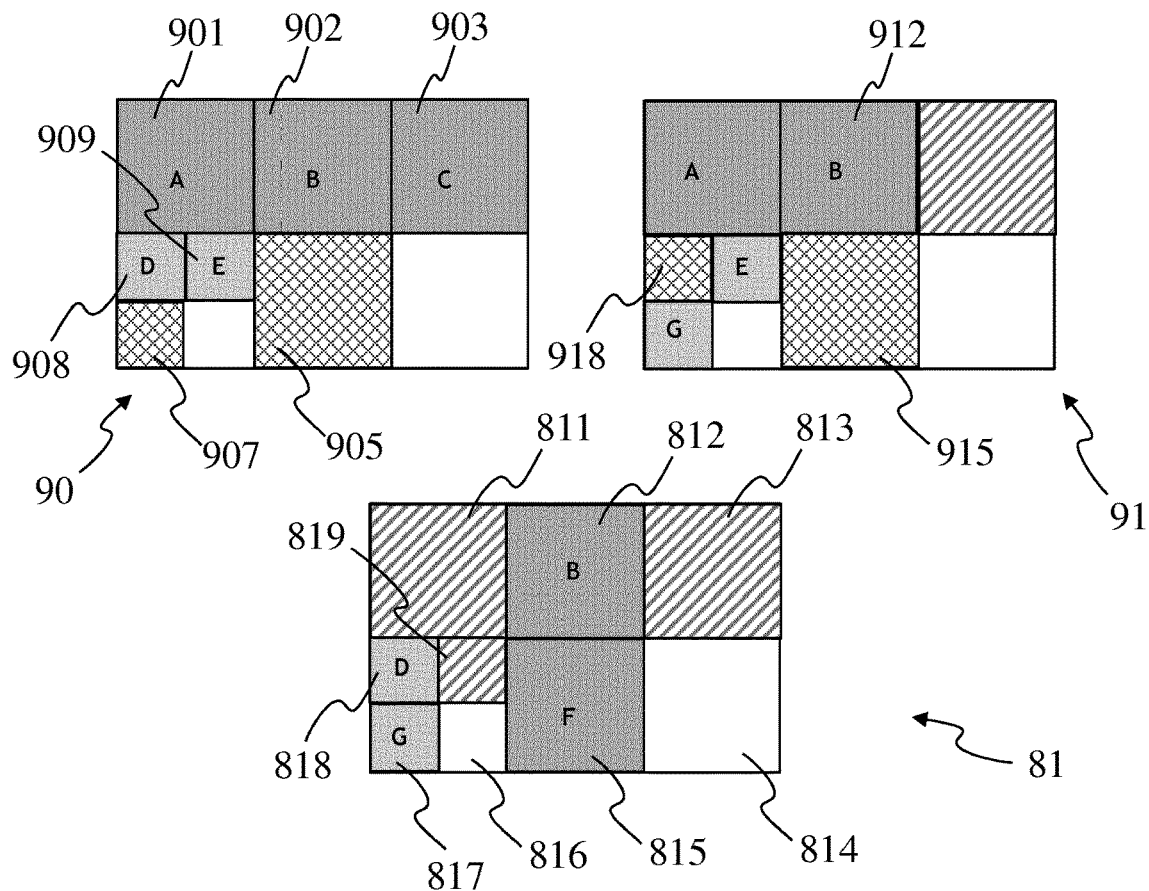
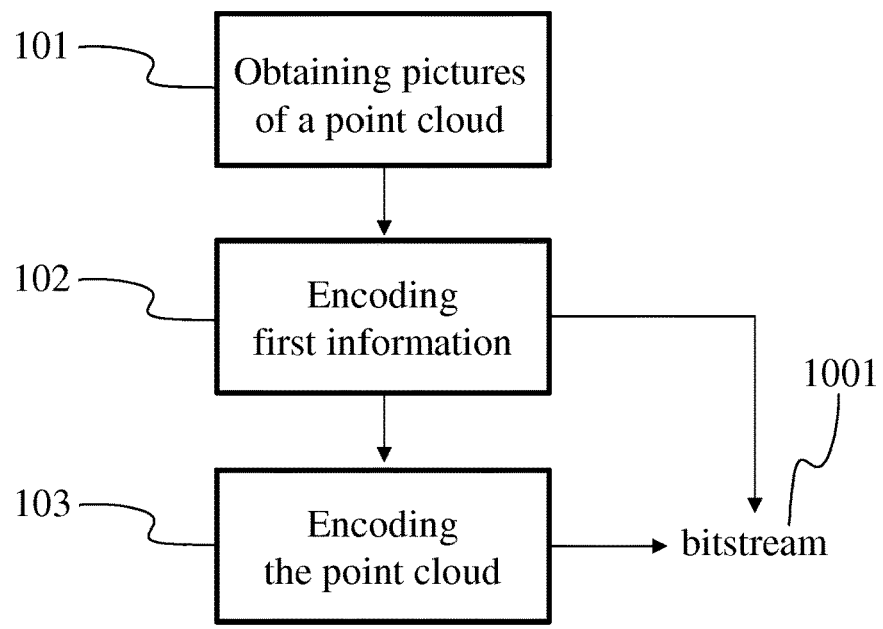
Fig 9
Fig 10

METHOD AND DEVICE FOR ENCODING A POINT CLOUD

This application claims the benefit, under 35 U.S.C. § 365 of International Application PCT/EP2018/068494, filed Jul. 9, 2018, which was published in accordance with PCT Article 21(2) on Jan. 17, 2019, in English, and which claims the benefit of European Patent Application No. 17305933.8, filed Jul. 13, 2017.

1. Technical Field

The present disclosure relates to the domain of coding and decoding of a point cloud representing the geometry and texture of a 3D object. Particularly, but not exclusively, the technical field of the present disclosure is related to encoding/decoding of 3D image data that uses a texture and depth projection scheme.

2. Background

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, these statements are to be read in this light, and not as admissions of prior art.

A point cloud is a set of points usually intended to represent the external surface of a 3D object but also more complex geometries like hair, fur that may not be represented efficiently by other data format like meshes. Each point of a point cloud is often defined by a 3D spatial location (X, Y, and Z coordinates in the 3D space) and possibly by other associated attributes such as a color, represented in the RGB or YUV color space for example, a transparency, a reflectance, a two-component normal vector, etc.

A colored point cloud might be considered, i.e. a set of 6-component points (X, Y, Z, R, G, B) or equivalently (X, Y, Z, Y, U, V) where (X,Y,Z) defines the spatial location of a point in a 3D space and (R,G,B) or (Y,U,V) defines a color of this point.

Point clouds may be static or dynamic depending on whether or not the cloud evolves with respect to time. It should be noticed that in case of a dynamic point cloud, the number of points is not constant but, on the contrary, generally evolves with time. A dynamic point cloud is thus a time-ordered list of sets of points.

Practically, point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such colored point clouds are typically static and huge.

Another use case is in topography and cartography in which, by using 3D representations, maps are not limited to the plane and may include the relief.

Automotive industry and autonomous cars are also domains in which point clouds may be used. Autonomous cars should be able to "probe" their environment to take safe driving decision based on the reality of their immediate neighboring. Typical sensors produce dynamic point clouds that are used by the decision engine. These point clouds are not intended to be viewed by a human being and they are typically small, not necessarily colored, and dynamic with a high frequency of capture. They may have other attributes like the reflectance that is a useful information on the material of the sensed object and may help the decision.

Virtual Reality and immersive worlds have become a hot topic recently and foreseen by many as the future of 2D flat video. The basic idea is to immerse the viewer in an environment all round him by opposition to standard TV where he can only look at the virtual world in front of him. There are several gradations in the immersivity depending on the freedom of the viewer in the environment. Colored point cloud is a good format candidate to distribute Virtual Reality (or VR) worlds. They may be static or dynamic and are typically of averaged size, say no more than millions of points at a time.

Point cloud compression will succeed in storing/transmitting 3D objects for immersive worlds only if the size of the bitstream is low enough to allow a practical storage/transmission to the end-user.

It is also crucial to be able to distribute dynamic point clouds to the end-user with a reasonable consumption of bandwidth while maintaining an acceptable (or preferably very good) quality of experience.

Well-known approaches project a colored point cloud representing the external surface of a 3D object, onto the faces of a cube encompassing the 3D object to obtain videos on texture and depth, and code the texture and depth videos using a legacy encoder such as 3D-HEVC (an extension of HEVC whose specification is found at the ITU website, T recommendation, H series, h265, http://www.itu.int/rec/T-REC-H.265-201612-I/en annex G and I). Several projections may be needed to handle occlusions. To obtain high compression efficiency, temporal inter prediction, which predicts the texture (or color) and/or the depth from other already coded pictures, may be implemented.

Performance of compression is close to video compression for each projected point, but some contents may be more complex because of occlusions, redundancy and temporal stability when dynamic point clouds are considered.

Regarding occlusions, it is virtually impossible to get the full geometry of a complex topology without using many projections. The required resources (computing power, storage memory) for encoding/decoding all these projections are thus usually too high.

Regarding redundancy, if a point is seen twice on two different projections, then its coding efficiency is divided by two, and this can easily get much worse if a high number of projections is used. One may use non-overlapping patches before projection, but this makes the projected partition boundary unsmooth, thus hard to code, and this terribly impacts the coding performance.

Regarding temporal stability, non-overlapping patches before projection may be optimized for an object at a given time but, when this object moves, patch boundaries also move and temporal stability of the regions hard to code (=the boundaries) is lost. Practically, one gets compression performance not much better than all-intra coding because the temporal inter prediction is inefficient in this context.

So, there is a trade-off to be found between seeing points at most once but with projected images that are not well compressible (bad boundaries) and getting well compressible projected images but with some points seen several times, thus coding more points in the projected images than actually belonging to the model.

3. SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of encoding a point cloud representing a three-dimensional object, the method comprising:

obtaining at least one group of temporally successive pictures of the point cloud, each picture of the at least one group comprising a first set of images, the images of the first set having a same location in each picture of the at least one group, a second set of projections being associated with the at least one group, a different projection of the second set being associated with each image of the first set;

encoding a first information representative of the projections of the second set; and encoding the point cloud according to the obtained pictures.

The present disclosure also relates to an apparatus adapted to encode a point cloud representing a three-dimensional object, the apparatus comprising a memory associated with a processor configured to:

obtain at least one group of temporally successive pictures of the point cloud, each picture of the at least one group comprising a first set of images, the images of the first set having a same location in each picture of the at least one group, a second set of projections being associated with the at least one group, a different projection of the second set being associated with each image of the first set;

encode a first information representative of the projections of the second set; and encode the point cloud according to the obtained pictures.

The present disclosure further relates to an apparatus adapted to encode a point cloud representing a three-dimensional object, the apparatus comprising:

means for obtaining at least one group of temporally successive pictures of the point cloud, each picture of the at least one group comprising a first set of images, the images of the first set having a same location in each picture of the at least one group, a second set of projections being associated with the at least one group, a different projection of the second set being associated with each image of the first set;

means for encoding a first information representative of the projections of the second set; and means for encoding the point cloud according to the obtained pictures.

The present disclosure relates to a method of decoding a point cloud representing a three-dimensional object from at least one bitstream, the method comprising:

obtaining the at least one bitstream that comprises encoded data of at least one group of temporally successive pictures of the point cloud, each picture of the at least one group comprising a first set of images, the images of the first set having a same location in each picture of the at least one group, decoding the at least one group of temporally successive pictures from the at least one bitstream;

decoding a first information representative of a second set of projections, the second set of projections being associated with the at least one group of temporally successive pictures, a different projection of the second set being associated with each image of the first set; and decoding the point cloud according to the decoded pictures.

The present disclosure also relates to an apparatus adapted to decode a point cloud representing a three-dimensional object, the apparatus comprising a memory associated with a processor configured to:

obtain the at least one bitstream that comprises encoded data of at least one group of temporally successive pictures of the point cloud, each picture of the at least one group comprising a first set of images, the images of the first set having a same location in each picture of the at least one group, decode the at least one group of temporally successive pictures from the at least one bitstream;

decode a first information representative of a second set of projections, the second set of projections being associated with the at least one group of temporally successive pictures, a different projection of the second set being associated with each image of the first set; and decode the point cloud according to the decoded pictures.

The present disclosure further relates to an apparatus adapted to decode a point cloud representing a three-dimensional object, the apparatus comprising:

means for obtaining the at least one bitstream that comprises encoded data of at least one group of temporally successive pictures of the point cloud, each picture of the at least one group comprising a first set of images, the images of the first set having a same location in each picture of the at least one group, means for decoding the at least one group of temporally successive pictures from the at least one bitstream;

means for decoding a first information representative of a second set of projections, the second set of projections being associated with the at least one group of temporally successive pictures, a different projection of the second set being associated with each image of the first set; and means for decoding the point cloud according to the decoded pictures.

The present disclosure also relates to a signal carrying on data representative of at least one picture of at least one group of temporally successive pictures of a point cloud, each picture of the at least one group comprising a set of images, the images having a same location in each picture of the at least one group, the signal further carrying on a first information representative of a set of projections, the projections being associated with the at least one group of temporally successive pictures, a different projection being associated with each image of the set of images.

The present disclosure also relates to a computer program product comprising instructions of program code for executing, by at least one processor, the abovementioned method of encoding and/or decoding, when the program is executed on a computer.

The present disclosure also relates to a (non-transitory) processor readable medium having stored therein instructions for causing a processor to perform at least the abovementioned method of encoding and/or decoding.

4. LIST OF FIGURES

The present disclosure will be better understood, and other specific features and advantages will emerge upon reading the following description, the description making reference to the annexed drawings wherein.

Figure 1:
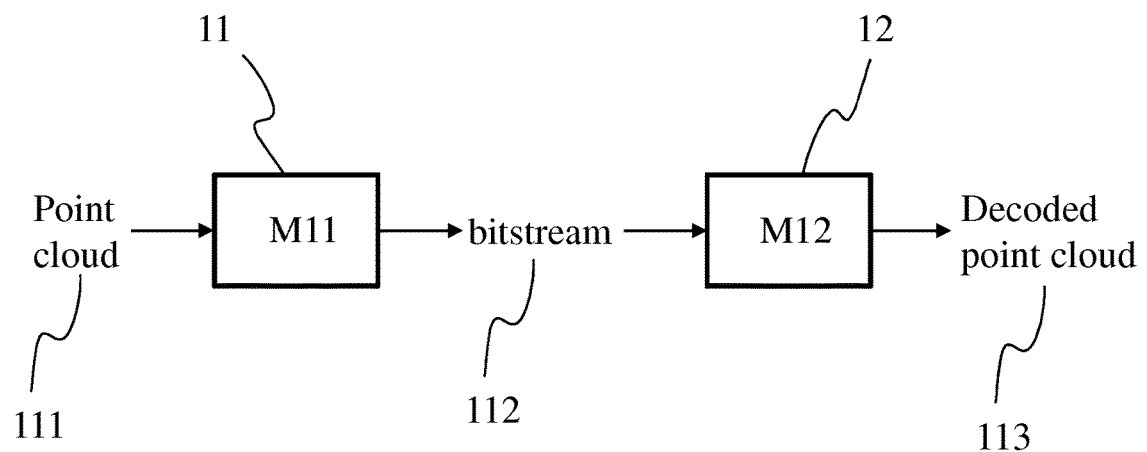
FIG. 1 shows an example of an encoding/decoding scheme of a point cloud, in accordance with an embodiment.
Figures 4A, 4B:
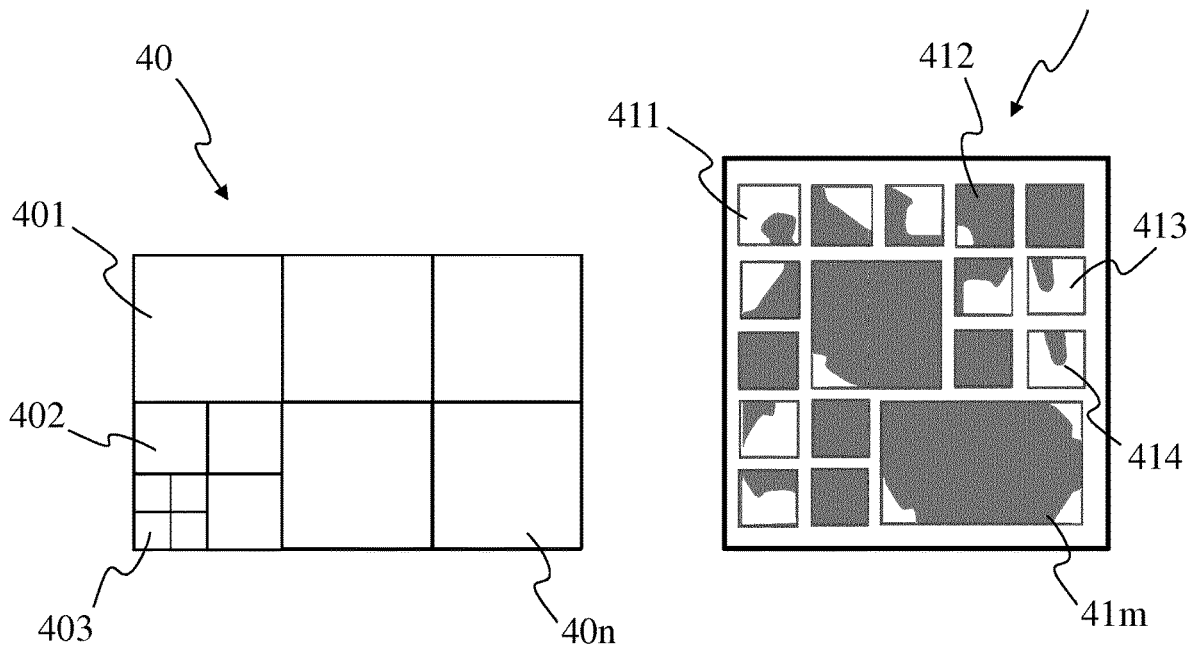
Figure 5:
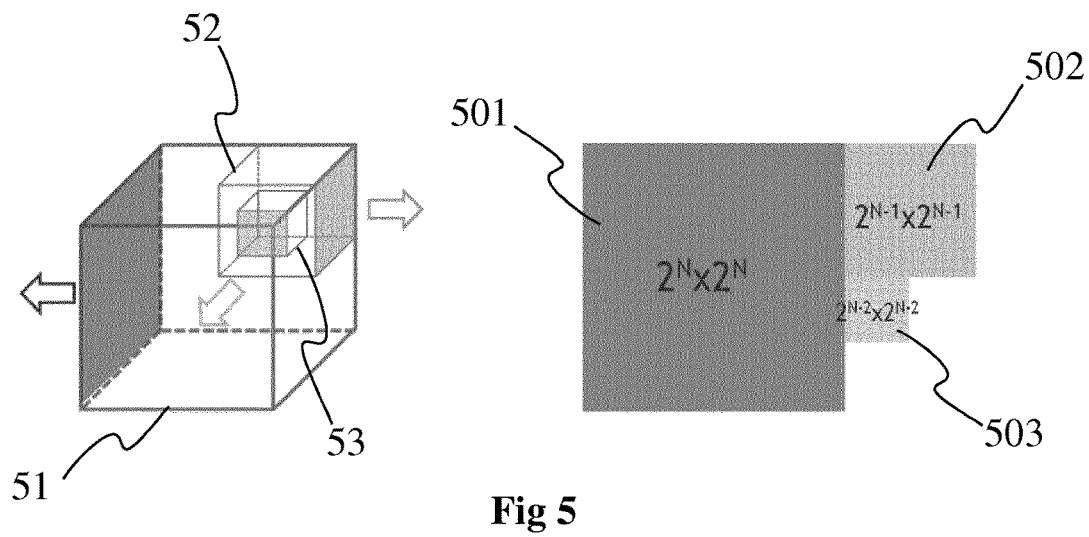
Figure 6:
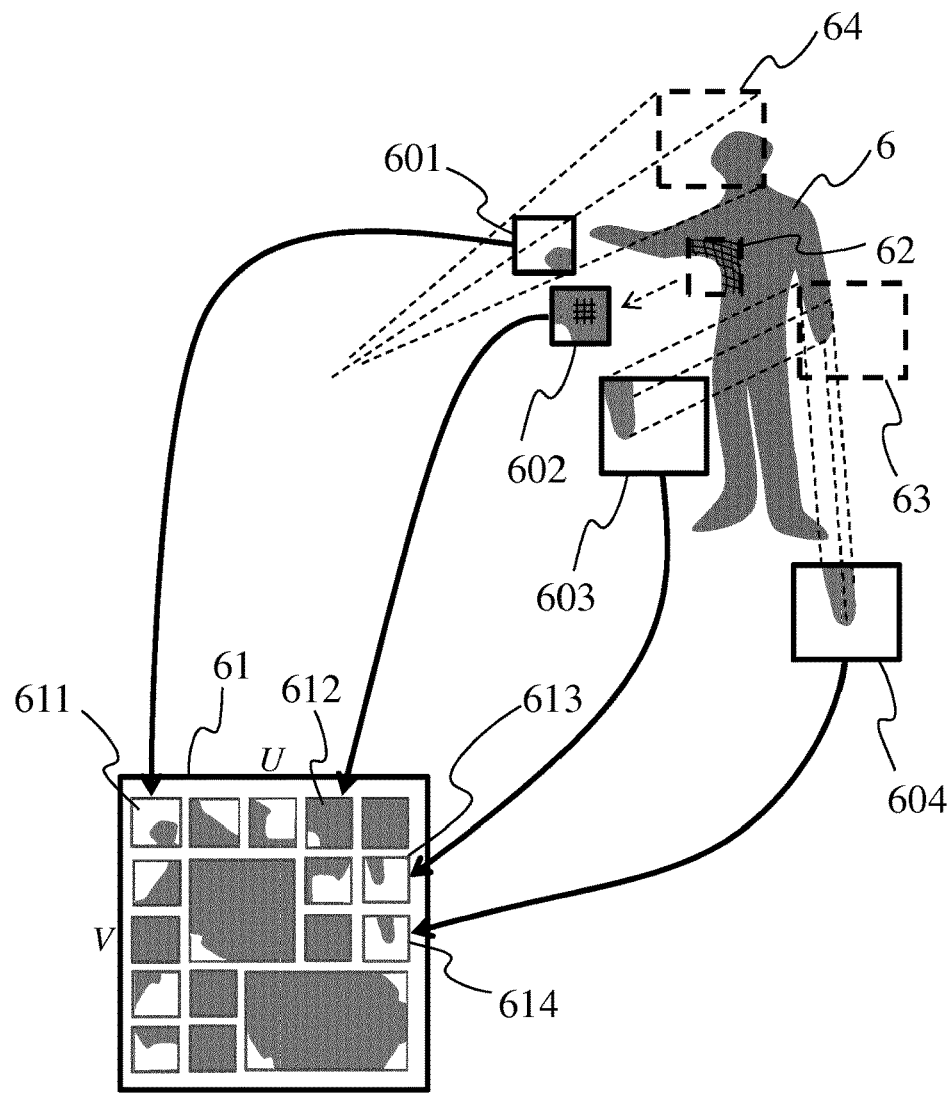
Figure 7:
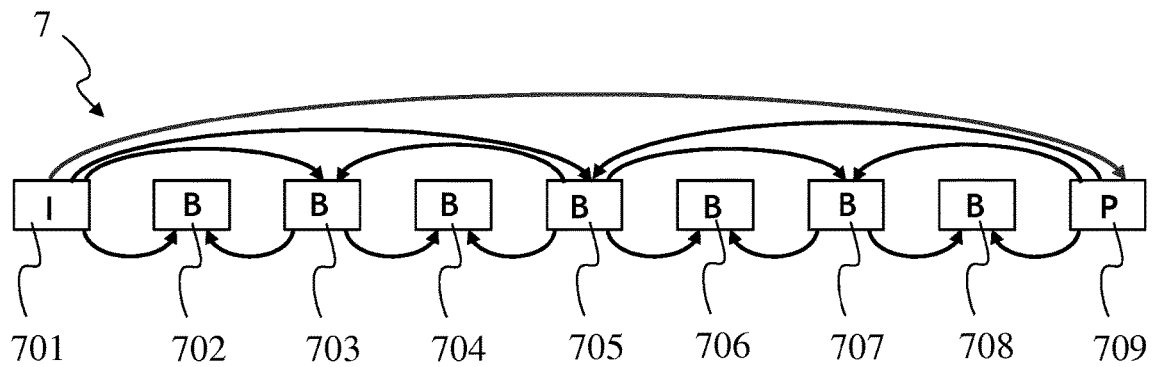
Figure 8:
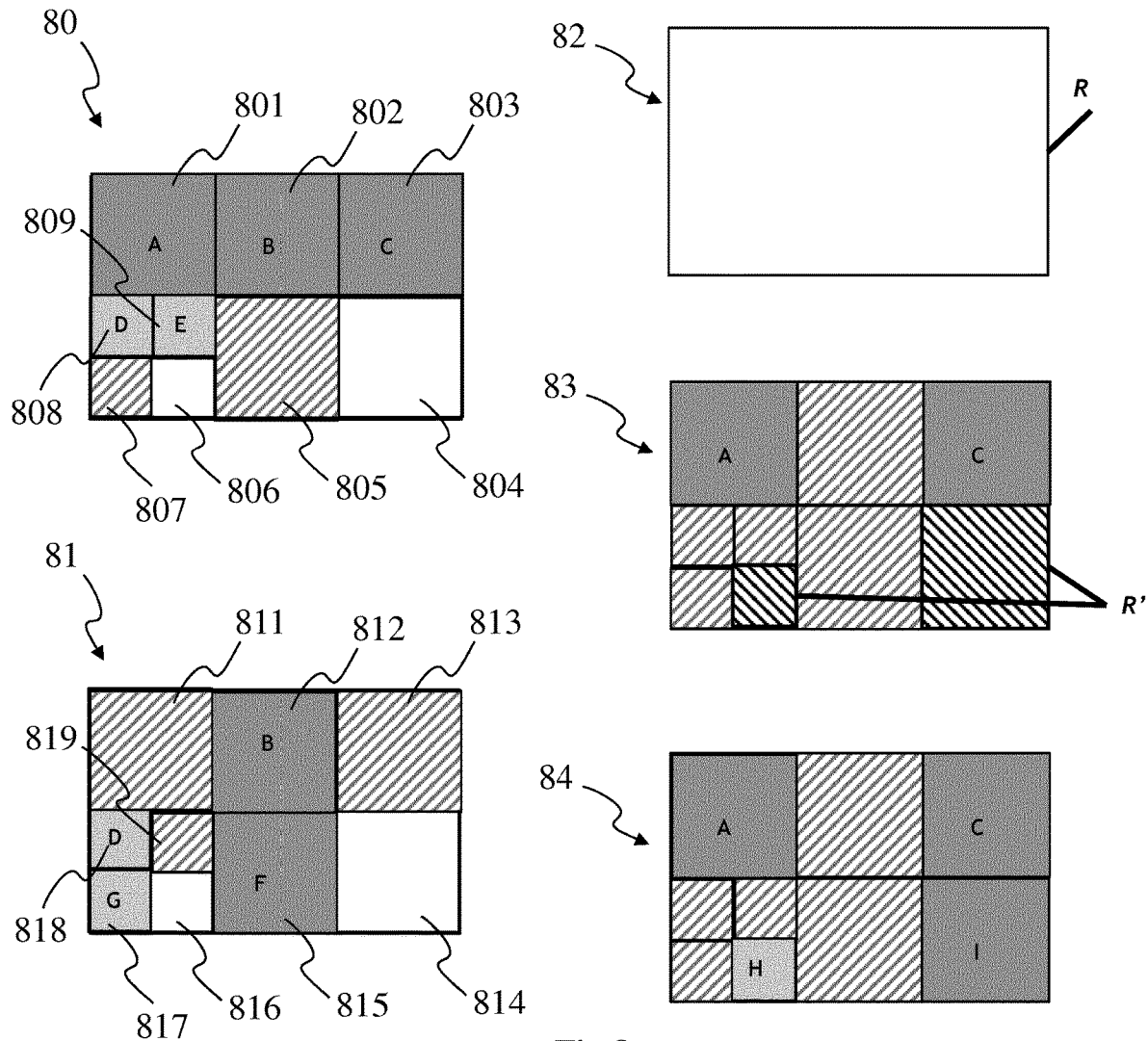
Figure 11:
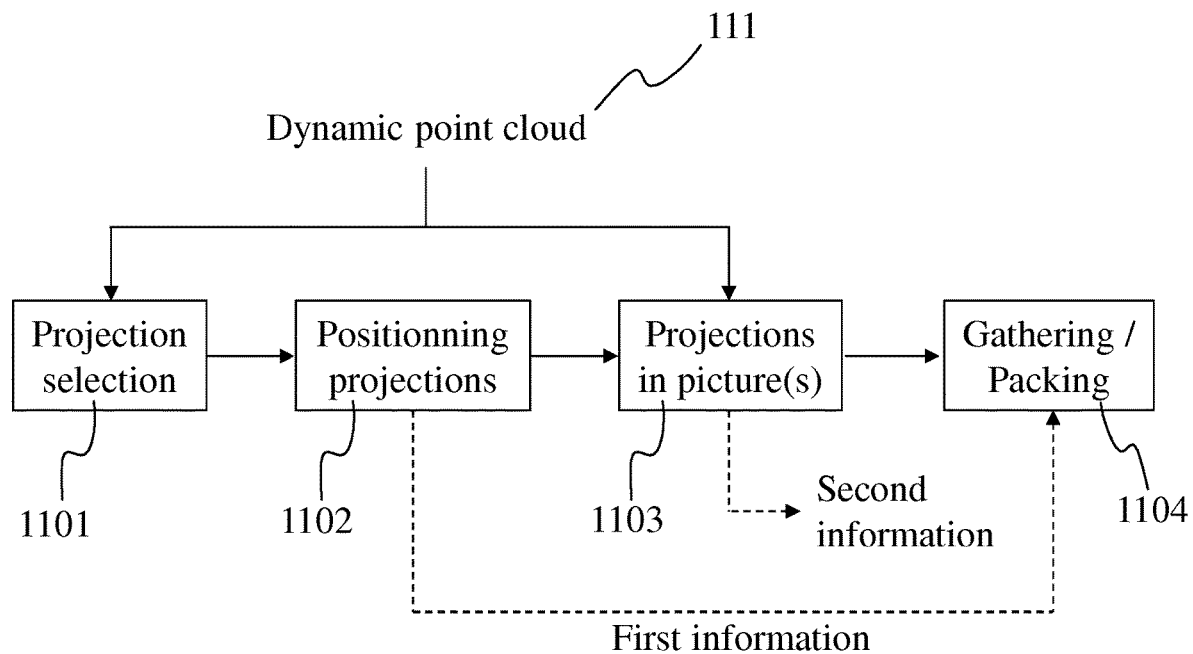
Figure 12:
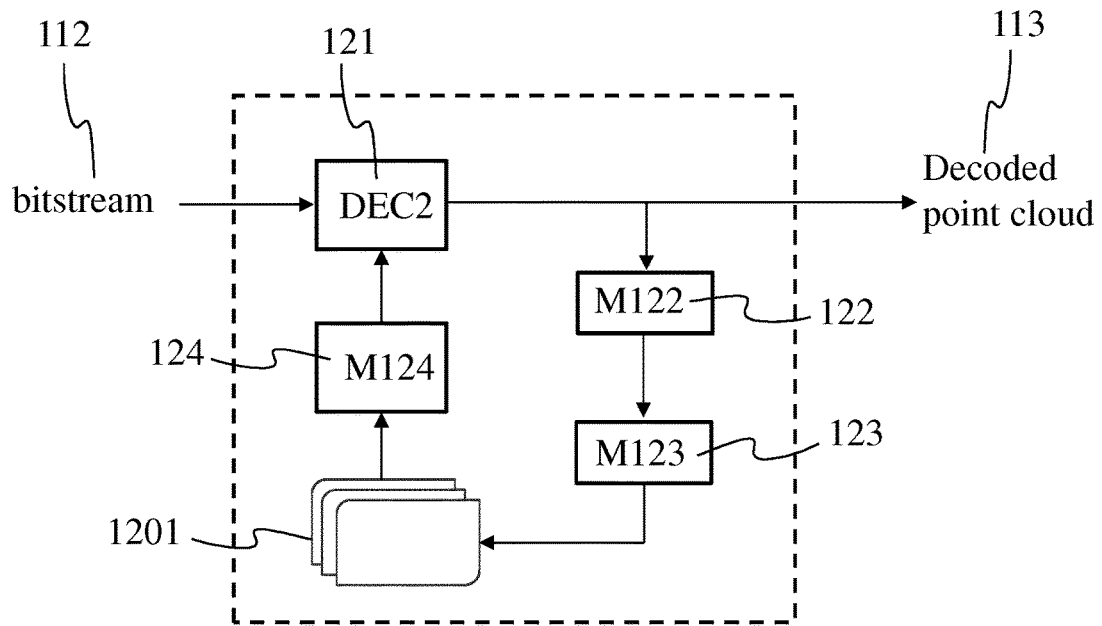
Figure 13:
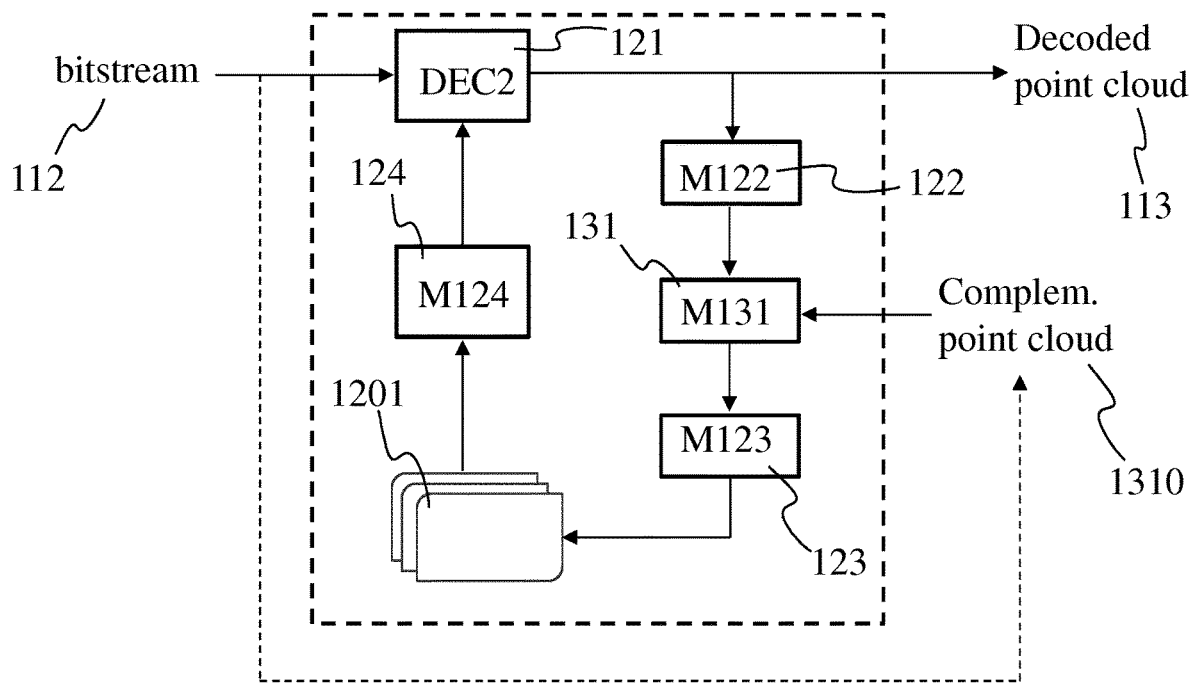
Figure 14:
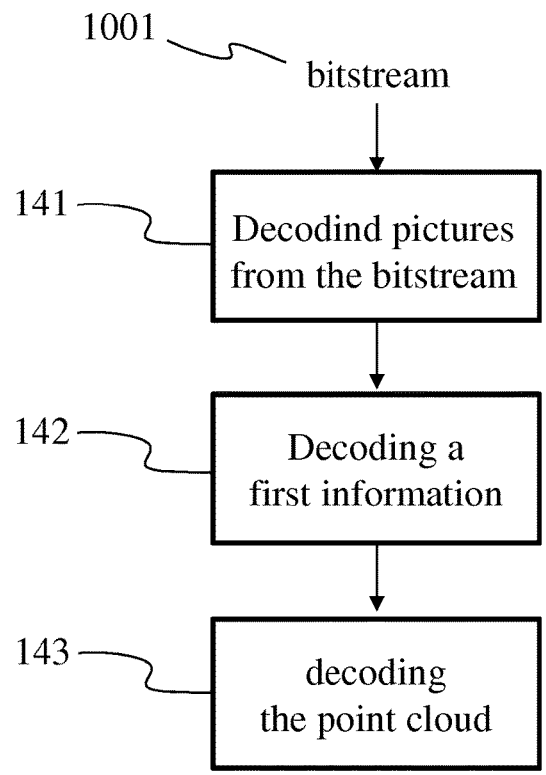
Figure 15:
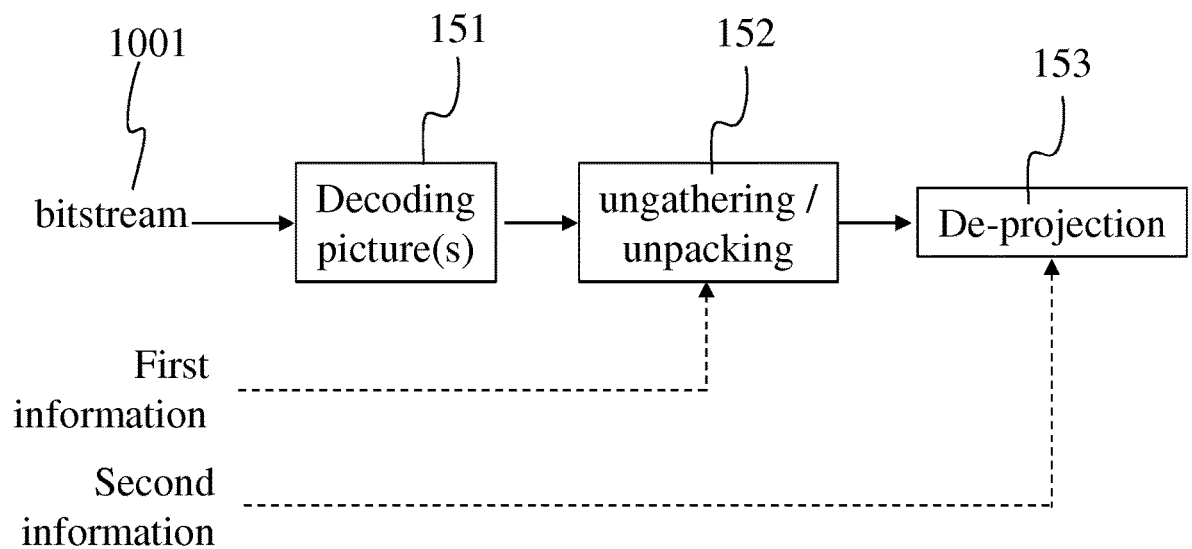
Figure 16:
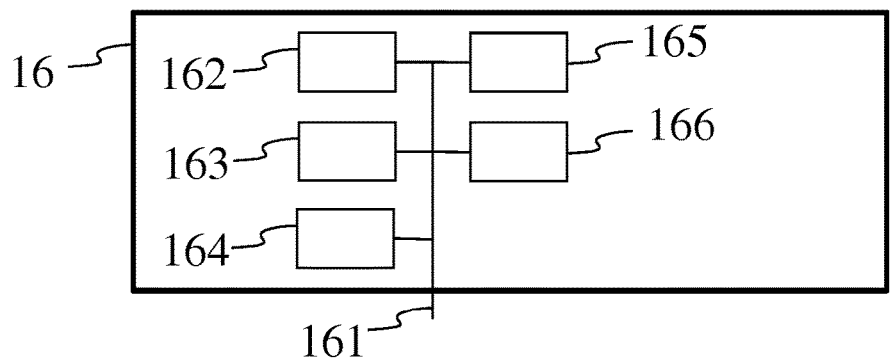
Figure 17:
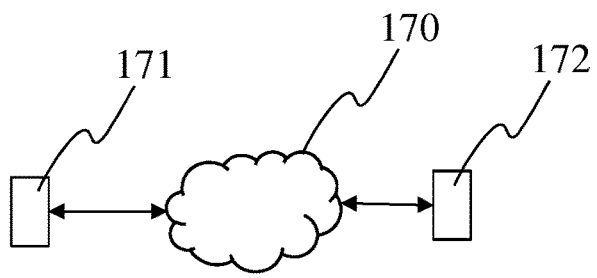
Figure 18:
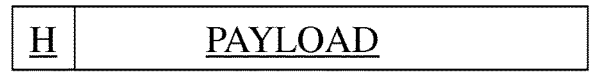
Figure 19:
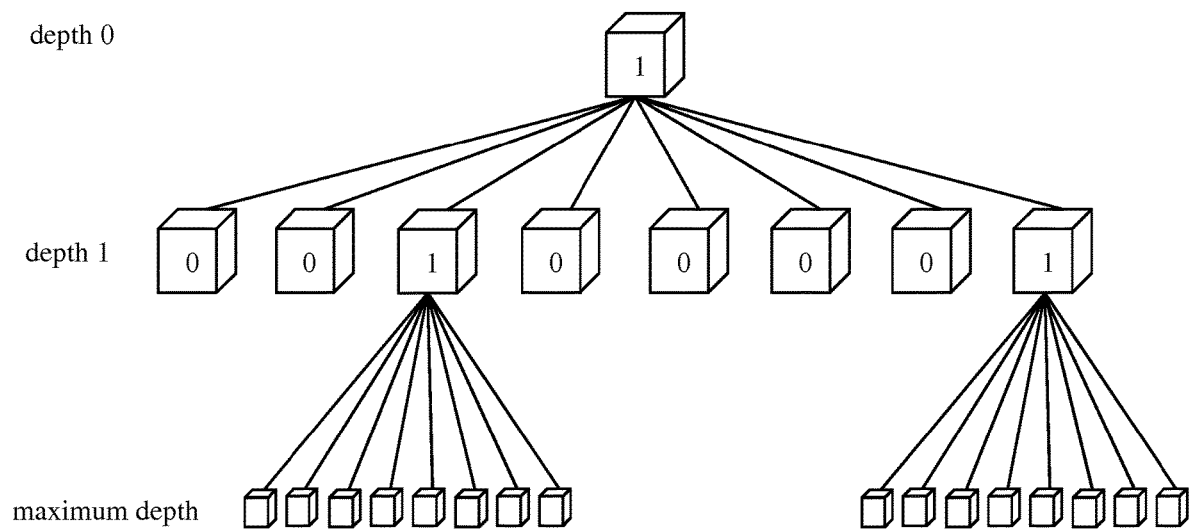

FIGS. 4A and 4B each shows an example of a picture representing the point cloud of FIG. 1, in accordance with non-limiting embodiments;

FIG. 5 shows an example of projections to obtain the picture of FIG. 4A, in accordance with non-limiting embodiments;

FIG. 6 shows an example of projections to obtain the picture of FIG. 4B, in accordance with non-limiting embodiments;

FIG. 7 shows a group of pictures representing the point cloud of FIG. 1, in accordance with non-limiting embodiments;

FIG. 8 shows an example of a process to obtain for example the picture of FIG. 4A or 4B, in accordance with a non-limiting embodiment;

FIG. 9 shows an example of a process to generate a reference picture associated for example with the picture of FIG. 4A, in accordance with a non-limiting embodiment;

FIG. 10 shows a third example of a process for encoding a point cloud of the scheme of FIG. 1, in accordance with a non-limiting embodiment;

FIG. 11 shows an example of a process implemented in the encoding of FIG. 10, in accordance with a non-limiting embodiment;

FIG. 12 shows a first example of a process for decoding a bitstream to obtain the decoded point cloud of FIG. 1, in accordance with a non-limiting embodiment;

FIG. 13 shows a second example of a process for decoding a bitstream to obtain the decoded point cloud of FIG. 1, in accordance with a non-limiting embodiment;

FIG. 14 shows a third example of a process for decoding a bitstream to obtain the decoded point cloud of FIG. 1, in accordance with a non-limiting embodiment;

FIG. 15 shows an example of a process implemented in the decoding of FIG. 14, in accordance with a non-limiting embodiment;

FIG. 16 shows an example of an architecture of an apparatus for implementing at least a part of the encoding/decoding scheme of FIG. 1, in accordance with a non-limiting embodiment;

FIG. 17 shows two remote devices, such as the apparatus of FIG. 16, communicating over a communication network, in accordance with a non-limiting embodiment;

FIG. 18 shows an example of a syntax of a signal transporting a bitstream obtained by the scheme of FIG. 1, in accordance with a non-limiting embodiment; and FIG. 19 shows an example of an octree to represent at least a part of the point cloud of FIG. 1, in accordance with a non-limiting embodiment.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

According to non-limitative embodiments, methods and devices to encode a point cloud in a bitstream are disclosed. Methods and devices to decode the encoded point cloud from the bitstream are also disclosed. Syntax of a signal comprising the bitstream is also disclosed.

In the following, an image contains one or several arrays of samples (pixel values) in a specific image/video format which specifies all information relative to the pixel values of an image (or a video) and all information which may be used by a display and/or any other device to visualize and/or decode an image (or video) for example. An image comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

In the following, a picture may be seen as an image, i.e. an array of samples, or as a collection of images.

A pixel value is represented by a vector of nv values, where nv is the number of components. Each value of a vector is represented with a number of bits which defines a maximal dynamic range of the pixel values.

One or more embodiments of a method for (and an apparatus configured for) encoding a point cloud that represents a three-dimensional (3D) object are described. One or more groups of temporally successive pictures are obtained, e.g. generated or received, the one or more groups forming for example an intra period. Each picture of the one or more groups comprises a first set of images, the images being spatially arranged in a same manner (i.e. having a same location) in each picture of the one or more groups. A second set of projections is associated with (or attached to) the one or more groups, a unique projection being associated with each image in such a way that a same projection is associated with only one single image and all projections are associated with the images. A first information representative of the projections is encoded, the first information comprising for example information on the mapping between the images and the projections, information about the parameters of the projections and/or information about the location of the images (and consequently the projections) in the picture. The point cloud may then be encoded according to the obtained pictures.

One or more specific embodiments of a corresponding method for (and a device configured for) decoding the point cloud from a bitstream that comprises the encoded data of the picture(s) representing the point cloud will also be described.

The use of pictures having a same arrangement of images enable to provide temporal consistency between the pictures, which may improve temporal prediction between the pictures and therefore improve the efficiency of the encoding.

Even if described with reference to a single picture of the point cloud, the present embodiments apply in a same way to a sequence of pictures, one reference picture may be obtained for each picture of at least a part of the sequence of pictures.

FIG. 1 shows schematically a diagram of an encoding/decoding scheme of a point cloud 111, according to a particular and non-limiting embodiment.

The point cloud 111 is encoded into encoded data under the form of a bitstream 112 via an encoding process 11 implemented in a module M11. The bitstream is transmitted to a module M12 that implements a decoding process 12 to decode the encoded data to obtain a decoded point cloud 113. The modules M11 and M12 may be hardware, software or a combination of hardware and software.

The point cloud 111 corresponds to a large collection of points representing an object, for instance the external surface or the external shape of the object. A point cloud may be seen as a vector-based structure, wherein each point has its coordinates (e.g. three-dimensional coordinates XYZ, or a depth/distance from a given point of view) and one or more components. An example of component is the color component that may be expressed in different color spaces, for example RGB (Red, Green and Blue) or YUV (Y being the luma component and UV two chrominance components). The point cloud may be a representation of the object as seen from one or more points of view. The point cloud may be obtained of different ways, e.g.:
- from a capture of a real object shot by one or more cameras, optionally complemented by depth active sensing device;
- from a capture of a virtual/synthetic object shot by one or more virtual cameras in a modelling tool;
- from a mix of both real and virtual objects.

The point cloud 111 may be a dynamic point cloud that evolves with the time, i.e. the number of points may vary with the time and/or the location (e.g. at least one of the coordinates X, Y and Z) of one or more points may vary with the time. The evolution of the point cloud may correspond to the motion of the object represented by the point cloud and/or to any change of shape of the object or part(s) of the object.

The point cloud 111 may be represented in a picture or in one or more groups of temporally successive pictures, each picture comprising a representation of the point cloud at a determined time 't'. The one or more groups of temporally successive pictures may form a video representative of at least a part of the point cloud 111.

The encoding process 11 may for example implement intra-picture coding and/or inter-picture coding. Intra-picture coding is based on intra-picture prediction that exploits spatial redundancy, i.e. correlation among pixels within one picture, by calculating prediction values through extrapolation from already coded pixels for effective delta coding. Inter-picture coding is based on inter-picture prediction that exploits temporal redundancy. Temporally independently coded so-called intra pictures 'I' use only intra coding. The temporally coded predicted pictures 'P' (or 'B') may use intra- and inter-picture prediction.

The decoding process 12 may for example correspond to the inverse operations of the encoding process 11 to decode the data encoded with the encoding process.

Figure 2:
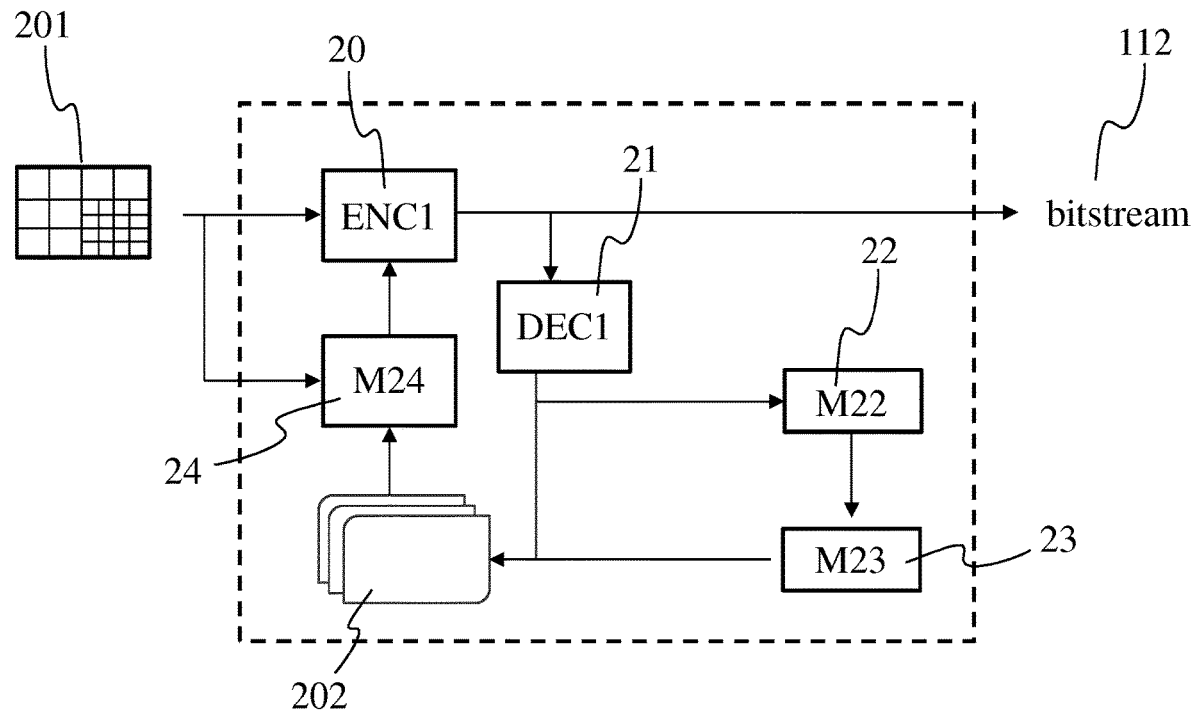
FIG. 2 shows a first example of a process for encoding a point cloud of the scheme of FIG. 1, in accordance with a non-limiting embodiment.

FIG. 2 shows operations for encoding the point cloud 111, according to a particular and non-limiting embodiment. The operations may be part of the encoding process 11 and may be implemented by the apparatus 16 of FIG. 16.

In an operation 20, data of a picture 201 of the point cloud is encoded by an encoder ENC1. The picture 201 is for example part of a group of pictures (GOP) and comprises data representative of the point cloud at a determined time 't'. The picture 201 comprises a set of images, at least one of the images of the set comprising first attributes that correspond to at least a part of the data of the picture 201. Each image that comprises first attributes is called first image. The first attributes may be obtained by projecting, according to a first projection, a part of the point cloud in each first image, the first attributes corresponding to the attributes of the points of the part of the point cloud projected onto said each first image. The attributes, and consequently the first attributes, may correspond to texture (or color) information and/or depth (or distance to a view point) information. The set of images of the picture 201 may also comprise one or more second images that do not comprise any attribute resulting from the projection of points of the point cloud. The data associated with each second image may for example correspond to default data, e.g. determined grey level for the texture information or a determined depth value, for instance zero, for the depth information. Examples of the picture 201 are provided on FIGS. 4A and 4B and a detailed description of the picture 201 will be provided with FIGS. 4A and 4B. The encoder ENC1 is for example compliant with a legacy encoder such as:
JPEG, specification ISO/CEI 10918-1 UIT-T Recommendation T.81, https://www.itu.int/rec/T-REC-T.81/en,
AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en,
HEVC (its specification is found at the ITU website, T recommendation, H series, h265, http://www.itu.int/rec/T-REC-H.265-201612-I/en), or
3D-HEVC (an extension of HEVC whose specification is found at the ITU website, T recommendation, H series, h265, http://www.itu.int/rec/T-REC-H.265-201612-I/en annex G and I).

The encoded data of the picture 201 may be stored and/or transmitted in the bitstream 112.

In an operation 21, the encoded data of the picture 201 is decoded by a decoder DEC1. The decoder DEC1 is compliant with the encoder ENC1, for example compliant with a legacy decoder such as:
JPEG,
AVC, also named MPEG-4 AVC or h264,
HEVC, or
3D-HEVC (an extension of HEVC).

The first attributes, encoded at operation 20, are decoded and retrieved, at operation 21, for example stored in a buffer memory, for use in the generation of a reference picture 202 associated with the picture 201.

In an operation 22 implemented by a module M22, each first image is de-projected according to the first projection associated with said each first image, i.e. the inverse operation of the first projection is performed, e.g. based on metadata comprising the parameters of the first projection. The deprojection of the decoded first attributes of the first images enable to obtain a three-dimensional (3D) representation of the point cloud, or part of it, represented in the picture 201. The 3D representation of the point cloud takes for example the form of a reconstructed point cloud that corresponds to the point cloud of picture 201 with potential differences due, for example, to the encoding operation 20 and/or decoding operation 21. Differences may also be due to occlusions during the projection process that generates first images from the point cloud.

In an operation 23 implemented by a module M23, second attributes are obtained from the 3D representation of the point cloud obtained at operation 22. Second attributes may for example be obtained for the second image(s) of the picture 201, i.e. for the images of the set of images of the picture 201 that comprise default data and no attribute from the points of the point cloud. For each second image of the set of images of picture 201, a set of second attributes may be obtained by projecting the points, or part of the points, of the 3D representation according to projection parameters of a second projection associated with said each second image. A specific second projection may be associated with each second image, each specific second projection being different from the first projection(s) associated with the first image(s) of the picture 201.

A reference picture 202 may be obtained from the picture 201 by fusing the decoded first attributes obtained from the operation 21 with the second attributes obtained from the operation 23. The reference picture may comprise the same structure than the picture 201, i.e. the same spatial arrangement of the set of images but with different data, i.e. with the decoded first attributes and the obtained second attributes. A detailed description of an example of a process to obtain the reference picture is provided hereinbelow with the description of FIG. 9.

The reference picture 202 may be used in an operation 24, implemented by a module M24. The operation 24 comprises for example the generation of predictors for inter prediction for the coding of one or more pictures of the point cloud, different from the picture 201 (e.g. pictures of the point cloud at determined times different from the time 't' of picture 201). The point cloud 111, or pictures representing the point cloud, may then be encoded by referring to the reference picture 201. According to a variant, the module M24 is part of the encoder ENC1.

The use of a reference picture that has been completed with data, i.e. the second attributes, obtained from the data, i.e. the first attributes, of the associated picture enables to increase the possibility of choosing the inter coding mode of further pictures of the point cloud referring to the obtained reference picture, thus increasing the compression efficiency.

Naturally, a plurality of reference pictures may be obtained in a same way as the reference picture 202, each reference picture of the plurality being obtained from a specific picture representing the point cloud, the encoding of the point cloud 111 referring to one or several reference pictures.

Figure 3:
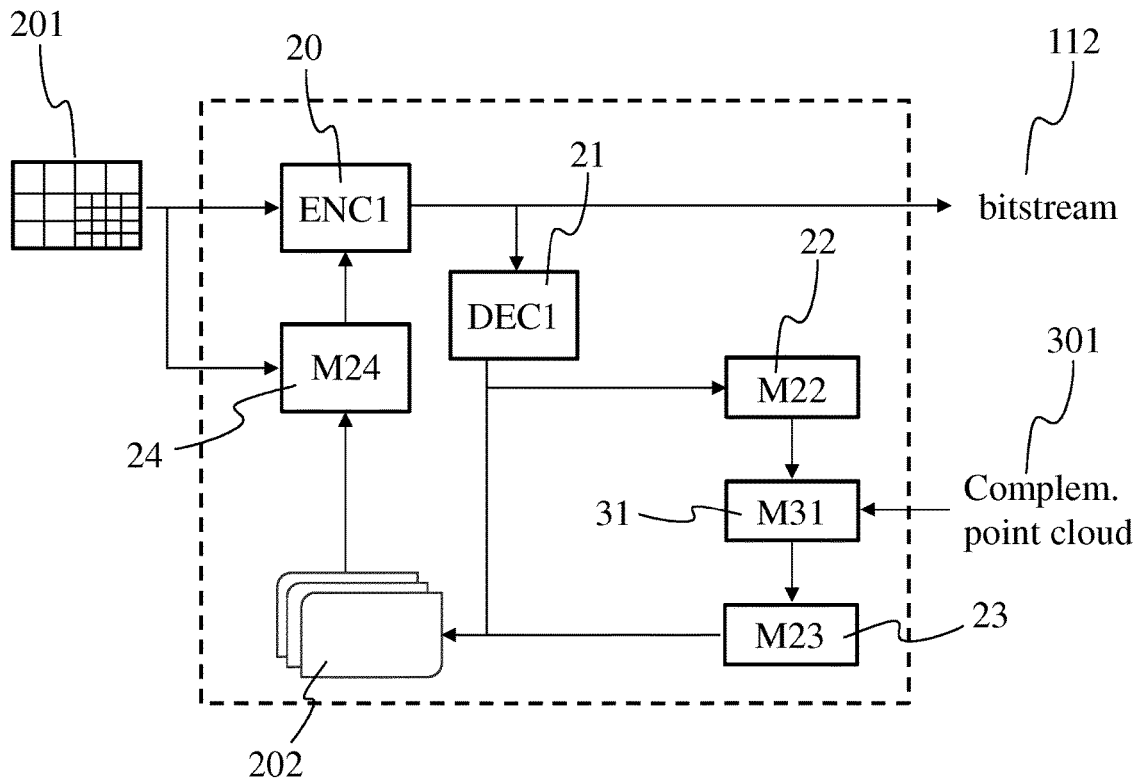
FIG. 3 shows a second example of a process for encoding a point cloud of the scheme of FIG. 1, in accordance with a non-limiting embodiment.

FIG. 3 shows operations for encoding the point cloud 111, according to a further particular and non-limiting embodiment. The embodiment of FIG. 3 may be considered as an alternative embodiment of the one of FIG. 2.

The operations 20, 21, 22, 23 and 24 are the same as the embodiment of FIG. 2.

An operation 31 implemented by a module M31 is added. The operation 31 consists in fusing the 3D representation of the point cloud obtained with operation 22 with a complementary point cloud 301, or with complementary part(s) of the point cloud. The complementary part(s) of the point cloud correspond for example to occluded part(s) of the point cloud that are not represented in the picture 201. The complementary part(s) 301 of the point cloud are for example represented with an octree.

An octree O comprises a root node, at least one leaf node and possibly intermediate nodes. A leaf node is a node of the octree O which has no child. All other nodes have children. Each node of an octree is associated with a cube. Thus, an octree O comprises a set $\{C_j\}$ of at least one cube $C_j$ associated with node(s). A leaf cube is a cube associated with a leaf node of an octree. In the example illustrated on FIG. 19, the cube associated with the root node (depth 0) is split into 8 sub-cubes (depth 1) and two sub-cubes of depth 1 are then split into 8 sub-cubes (last depth=maximum depth=2). The sizes of the cubes of a same depth are usually the same but the present embodiments are not limited to this example. A specific process may also determine different numbers of sub-cubes per depth, when a cube is split, and/or multiple sizes of cubes of a same depth or according to their depths.

The leaf cubes associated with the leaf nodes of the octree O may then include or not a point, preferably located at the center of the leaf cube, representative of at least a part of the point cloud 111. Color values may be attached to each point included in a leaf cube of the octree O. The color values may be represented in an image OI, associated to the octree O, that associates the color of the pixels of the image OI to the color of the points included in the leaf cubes of the octree O. Said association may be obtained by a predetermined scanning order of the leaf nodes of the octree O and a predetermined scanning order of the pixels of the image OI. For example, the predetermined scanning order of the octree O may be a 3D recursive Hilbert path, and the predetermined scanning order of the image OI may be a raster-scan order.

Thus, a representation of an octree, representative of a part of a colored point cloud, may contain the following information
  a first set of flags indicating the splitting (or not) of a node into (eight) child nodes,
  a second set of flags indicating the presence (or not) of a point at the center of a leaf cube associated to a leaf node,
  a colored image OI, and/or
  scanning orders of the leaf cubes associated with the leaf nodes and of the pixels of the image OI Once completed, the 3D representation is projected according to one or more second projections to obtain the second attributes at operation 23.

FIGS. 4A and 4B each shows a picture of the point cloud 111, for example the picture 201, according to particular and non-limiting embodiments.

FIG. 4A illustrates a first example of a picture 40 of the point cloud, for example a picture of a GOP of the point cloud for example the picture 201. The picture 40 is composed of a set of n images 401, 402, 403, 40n, n being an integer greater than or equal to 2. Each of the image 401 to 40n corresponds to an array of pixels, the size and/or the definition of which may vary from an image to another image. For example, the definition of the images 401 and 40n is the same while the definitions of pictures 402 are different from each other and from the definition of the images 401 and 40n. In the example of FIG. 4A, the images 401 to 40n are spatially arranged to cover the whole picture 40 without overlap between the images. According to a variant, the images 401 to 40n do not cover the whole picture, a space existing between the images 401 to 402, or between at least some of them, i.e. the edges of two adjacent images may not be in contact. Data may be associated with each pixel of the images 401 to 40n, for example texture information and/or depth information. The texture information may for example be stored under the form of grey levels associated with each channel of a color space (e.g. RGB color space or YUV color space), the grey level for each channel being for example expressed with a first determined number of bits, e.g. 8, 10 or 12 bits. The depth information may for example be stored under the form of a value, for example in the α channel with a second determined number of bits, e.g. 8, 10 or 12 bits. Thus, four components RGBα or YUVα (e.g. four 10-bit channels) may for example be associated with each pixel in the picture 40 to represent the point cloud at a determined time 't'. According to a variant, a first picture 40 is used to store the texture information (e.g. 3 components RGB or YUV) and a second picture with the same arrangement of images is used to store the depth information, both pictures representing the point cloud at time 't'.

The set of images forming the picture 40 may for example comprise one or more first images and potentially one or more second images. The first image(s) may for example be obtained by projecting points of the point cloud according to first projection(s), e.g. a different first projection per first image, as illustrated on FIG. 5.

FIG. 5 illustrates a cube 51 bounding at least a part of the point cloud, according to a particular and non-limiting embodiment.

The cube 51 is for example subdivided into 8 sub-cubes (only one sub-cube 52 of the 8 sub-cubes being shown for clarity purpose) at a first subdivision level. The sub-cube 52 is also subdivided into 8 sub-cubes (only one sub-cube 53 of the 8 sub-cubes being shown for clarity purpose) at a second subdivision level. At each subdivision level, a part of the points of the point cloud may be projected (e.g. according to an orthogonal projection) onto one or more faces of the cube(s) (e.g. the faces with grey filling). For example, points of the point cloud are projected onto the face 501 of the cube 51, onto the face 502 of the cube 52 and onto the face 503 of the cube 53. The faces are for example discretized to form arrays of pixels with definitions/sizes that depend from the subdivision level of the cube. For example, for a pixel of a face of a cube, the point of the point cloud that is projected onto said pixel corresponds to the point of the point cloud that is the closest from said pixel when launching a ray from said pixel and orthogonal to the face comprising said pixel. The attributes associated with said pixel correspond to the attributes (texture and/or depth) of the point projected onto said pixel.

The face 501 is for example used to form the image 401, the face 502 to form the image 402 and the face 503 to form the image 403.

One or more images of the set of images 401 to 40*n* may not be generated from a first projection and may then not receive data (attributes) from points of the point cloud, this or these images being called second images. For such second images, default texture information and/or default depth information is assigned to each pixel of the second images. The default texture/depth information may be system- or user-defined value(s).

FIG. 4B illustrates a second example of a picture 41 of the point cloud, for example a picture of a GOP of the point cloud, for example the picture 201. The picture 41 is composed of a set of m images 411, 412, 413, 414, 41*m*, m being an integer greater than or equal to 2. The arrangement of the images 411 to 41*m* may be different from the one of picture 40 with for example free space between the images 411 to 41*m*. The images 411 to 41*m* may have varied sizes and/or definitions. Each picture may receive attributes from the points of the point cloud, said attributes being associated with at least some of the pixels of each image 411 to 41*m*. For example, the part of each image that receives attributes from the point cloud is shown as a grey area while the part of the image that does not receive attributes from the point cloud is shown as a white area, said white area may be filled with default value, like the free space between images. Just like for the picture 40 of FIG. 4A, the data associated with the pixels of the images 411 to 41*n* may correspond to texture information and/or depth information. In a variant, a first picture 41 is used to store the texture information (e.g. 3 components RGB or YUV) and a second picture 41 with the same arrangement of images 411 to 41*m* is used to store the depth information, both pictures representing the point cloud at time 't'.

The set of images forming the picture 41 may for example comprises one or more first images and potentially one or more second images. The first image(s) (at least the grey area of each first image) may for example be obtained by projecting points of the point cloud according to first projection(s), e.g. a different first projection per first image, as illustrated on FIG. 6.

FIG. 6 illustrates the obtaining of the first images of the set of images forming the picture 41, according to a non-limiting embodiment. The point cloud representing the 3D object 6 is partitioned into a plurality of 3D parts, e.g. 50, 100, 1000 or more 3D parts, 3 of them being illustrated on FIG. 6, i.e. the 3D parts 62, 63 and 64, the 3D part 64 comprising points of the point cloud representing part of the head of the person, the 3D part 62 comprising points of the point cloud representing an armpit of the person and the 3D part 63 comprising points of the point cloud representing a hand of the person. One or more first images of each 3D part or of a part of the 3D parts are generated to represent each 3D part in two dimensions, i.e. according to a 2D parametrization. For example, a 2D parametrization 601 is obtained for the 3D part 64, a 2D parametrization 602 is obtained for the 3D part 62 and 2 different 2D parametrizations 603 and 604 are obtained for the 3D part 63. The 2D parametrization may vary from a 3D part to another one. For example, the 2D parametrization 601 associated with the 3D part 61 is a linear perspective projection while the 2D parametrization 602 associated with the 3D part 62 is a LLE and the 2D parametrizations 603 and 604 associated with the 3D part 63 are both orthographic projections according to different points of view. According to a variant, all 2D parametrizations associated with all 3D parts are of the same type, e.g. a linear perspective projection or an orthographic projection. According to a variant, different 2D parametrizations may be used for a same 3D part.

A 2D parametrization associated with one given 3D part of the point cloud corresponds to a browsing in 2 dimensions of the given 3D part of the point cloud allowing to sample the given 3D part, i.e. a 2D representation of the content (i.e. the point(s)) of this given 3D part comprising a plurality of samples (that may correspond to the pixels of a first image), the number of which depending from the sampling step that is applied. A 2D parametrization may be obtained in diverse ways, for example by implementing any one of the following methods:

- linear perspective projection of the points of the 3D part of the point cloud onto a plane associated with a point of view, the parameters representative of the linear perspective projection comprising the location of the virtual camera, the spatial sampling step and the field of view in the 2 dimensions;
- orthographic projection of the points of the 3D part of the point cloud onto a surface, the parameters representative of the orthographic projection comprising the geometry (shape, size and orientation) of the projecting surface and spatial sampling step;
- LLE (Locally-Linear Embedding) that corresponds to a mathematical operation of dimension reduction, here applied to convert/transform from 3D to 2D, the parameters representative of the LLE comprising the transformation coefficients.

Each first image (and second image) has advantageously a rectangular shape to ease the packing process on the picture 41.

FIG. 7 shows a group of pictures (GOP) 7, according to a non-limiting embodiment. Each picture 701, 702, 703, 704, 705, 706, 707, 708 and 709 of the GOP may for example correspond to the picture 201 or the picture 40 or the picture 41. The GOP 7 may for example comprise pictures of different types, for example a I picture 701 (i.e. intra coded picture), a P picture 709 (i.e. predictive coded picture) and 'B' pictures 702 to 708 (i.e. bipredictive code picture). Arrows illustrate the coding relationship between pictures. For example, the P picture 709 is coded by referring to the I picture 701, the B picture 705 is coded by using reference to pictures 701 and 709, the B picture 703 is coded by using reference to pictures 701 and 705, the B picture 702 is coded by using reference to pictures 701 and 703. The GOP may be part of an intra period, i.e. a sequence of pictures comprised between two I pictures, the first I picture belonging to said intra period and indicating the beginning of the intra period while the second (temporally speaking) I picture not belonging to said intra period but to the following intra period. The intra period starts with the I picture 701 and may comprise a plurality of P pictures, several B pictures being comprised between the I picture 701 and the first (temporally speaking) P picture 709, several B pictures being comprised between the first P picture and the second (temporally speaking) P picture and so on.

An I picture is a picture that is coded independently of all other pictures. Each intra period begins (in decoding order) with this type of picture.

A P picture comprises motion-compensated difference information relative to previously decoded pictures. In compression standards such as MPEG-1, H.262/MPEG-2, each P picture can only reference one picture, and that picture must precede the P picture in display order as well as in decoding order and must be an I or P picture. These constraints do not apply in more recent standards such as H.264/MPEG-4 AVC and HEVC.

A B picture comprises motion-compensated difference information relative to previously decoded pictures. In standards such as MPEG-1 and H.262/MPEG-2, each B picture can only reference two pictures, the one which precedes the B picture in display order and the one which follows, and all referenced pictures must be I or P pictures. These constraints do not apply in more recent standards such as H.264/MPEG-4 AVC and HEVC.

FIG. 8 shows an example of a process to obtain a picture such as picture 201, 40 and/or 41, or at least the structure of such a picture, in accordance with a non-limiting embodiment.

Pictures 80 and 81 correspond to two pictures of the point cloud at different times t1 and t2 respectively, t2 being for example greater than t1. The pictures 80 and 81 are for example a part of a GOP such as the GOP 7. The other pictures of the GOP are not represented in FIG. 8. The picture 80 comprises a set of images 801 to 809 and the picture 81 comprises a set of images 811 to 819 that are arranged in a same manner as the images 801 to 809 in picture 80.

In each picture 80 and 81, the images filled with a shade of grey (i.e. images 801, 802, 803, 808 and 809 for picture 80 and images 812, 815, 817 and 818 for picture 81) correspond to first images, i.e. images having data associated with their pixels that is obtained from the point cloud, for example by projection or by 2D parametrization.

In each picture 80 and 81, the images filled with upward diagonal stripes (i.e. images 805, 807 for picture 80 and images 811, 813, 819 for picture 81) correspond to second images, i.e. images with no data obtained from the point cloud, that have a corresponding first image in another picture of the GOP with data obtained from the point cloud. For example, image 815 of picture 81 corresponds to image 805 of picture 80, i.e. images 805 and 815 have a same position and same size in each picture 80 and 81.

In each picture 80 and 81, the image with no filling (i.e. white images, for example images 804, 806 for picture 80 and images 814, 816 for picture 81) correspond to second images, i.e. images with no data obtained from the point cloud, that do not have any corresponding image in another picture of the GOP with data obtained from the point cloud. For example, images 804 corresponds to image 814 and image 806 correspond to image 816, none of the images 804, 814 (respectively 806, 816) having data obtained from the point cloud.

Letters A, B, C, D, E, F and G indicates the type of first projection used to obtain data from the point cloud. Pictures 80 and 81 are compatible in the sense that a type of first projection used in one of the image does not conflict with another type of first projection in the corresponding picture in another picture. For example, first projection D (respectively B) is present in both pictures but associated with corresponding images 808, 818 (respectively 802, 812) that are located at the same place with the same size. First projection A is only used in picture 80 and is associated with a first image 801, but the corresponding image 811 in picture 81 having no associated first projection, there is no conflict.

A first example of obtaining the arrangement of images in the pictures of a GOP is now explained with regard to the right-hand part of FIG. 8.

A set S of compatible pictures is given (for example the set comprising the pictures 80 and 81), and another picture Pi of the GOP (that does not belong to the set S) is selected. The goal is to arrange images in the picture Pi without conflicting with images belonging to the pictures of the set S.

In a first operation 82, an empty rectangle R having the same size as each picture of the GOP is generated.

In a second operation 83, the projections of the picture Pi that are also present in the set S are located at the same location in the picture Pi. For example, if it is considered that projections A, C, H and I are used for picture Pi, projections A and C that exist in at least one picture of the set S (i.e. picture 80) are arranged at the locations of the first images having associated projections A and C in the set S. Remaining projections H and I are still to be positioned in the rectangle R. To reach that aim, the remaining space R' in the rectangle R is determined (illustrated with downward diagonal black stripes).

In a third operation 84, projections H and I are arranged in the remaining space R' of the rectangle R.

According to a variant of the first example of obtaining the arrangement of images in the pictures of a GOP, a determined picture with associated projections is selected among the plurality of pictures and used as a starting picture for defining the location of the projections and the remaining space, instead of used the set S of compatible pictures. The determined picture that is selected is for example the first picture of the GOP or the picture having the maximum number of projections in comparison to the other pictures of the GOP. Then the other pictures of the GOP are selected one by one to determine where to arrange the remaining projections, as explained in operations 82, 83 and 84.

According to a further example of obtaining the arrangement of images in the pictures of a GOP, the list of projections used in all pictures of the GOP is determined. The projections are then arranged in the empty rectangle R, for example using a method optimizing the space. Once each projection has been arranged in an area of the empty rectangle, the pattern of images is applied to each picture of the GOP to project the data of the point cloud at the right area of the picture according to the associated first projection.

Obtaining a same arrangement of images enable to provide temporal consistency between the pictures of the GOP or the GOPs or the intra period, which may improve temporal prediction between the pictures of the GOP(s)/intra period and therefore improve the efficiency of the encoding.

FIG. 9 shows an example of a process to generate reference pictures, e.g. reference pictures 202 of FIG. 2, in accordance with a non-limiting embodiment.

In FIG. 9, picture 81 represents a picture to be encoded, for example by implementing the encoding process of FIG. 2. The picture 81 comprises the set of images 811 to 819, among which images 812, 815, 817 and 818 are first images as their data is obtained by projecting points of the point cloud according to respectively the first projections B, F, G and D. To benefit from the efficiency of inter coding, one or more reference pictures are needed with motion information at block level for example.

Pictures 90 and 91 each represents a reference picture associated with a picture of the GOP (or of the intra period) comprising the picture 81 to encode. Picture 90 is for example a reference picture associated with (and obtained from) the picture 80 of FIG. 8. Data of the first image 812 obtained with projection B may be coded by referring to the corresponding first image 902 and 912 that are obtained from with the same projection B, i.e. from the same part of the point cloud (at different times) with the same projection parameters, as these first images 902 and 912 have been obtained directly from the associated pictures of the GOP.

To encode the data of the first image 815, corresponding data in the reference picture 90 and/or 91 is needed. As it appears on FIG. 8, the data corresponding to the image 905 is not present in the associated picture 80, the image 805 (now corresponding to the image 905 in the picture 90) being a second image, i.e. an image of the picture with default attributes and not with attributes obtained from the point cloud. To obtain data to associated with the pixels of the image 905 of the reference picture 90, the data (i.e. the attributes) of the images 901, 902, 903, 908 and 909 is de-projected (using respectively the metadata of the associated projections A, B, C, D, E) to obtain a 3D representation of the point cloud that has been encoded in the picture 80 used to obtain the reference picture 90. The de-projection performs the inverse projection (relatively to the projection used to obtain the considered first image) using the metadata of the associated projection with the depth information associated with the pixels of the considered first image to obtain a 3D representation of a reconstructed point cloud. The texture information associated with the pixels is assigned to the reconstructed points of the point cloud obtained with the de-projection. To obtain the data (i.e. depth and/or texture information) of the image 905, the obtained 3D representation is projected according to the projection F associated with the image 905, a projection being associated with each image during the process described hereinabove with regard to FIG. 8. The same operations are reiterated to obtain the data (attributes) of the images 907, 915 and 918 (illustrated with outlined diamond grid filling pattern) that may be used to encode the data of the images 815, 817 and 818 of the picture 81. With such a de-projection/reprojection process, it is possible to complete the parts of the reference pictures having no data obtained directly from the first images of the associated pictures of the GOP.

Consequently, efficient inter prediction is now possible between the reference pictures 90 and 91, and the picture 81 to be encoded. For example, the image 815 is now better predicted by images 905 and 915 once the de-projection/ reprojection process has been performed.

FIG. 10 shows operations for encoding the point cloud 111, according to a particular and non-limiting embodiment. The operations may be part of the encoding process 11 and may be implemented by the apparatus 16 of FIG. 16.

In a first operation 101, one or more groups of temporally successive pictures are obtained, each picture comprising data representing the point cloud (or at least a part of it) at a diverse time t. Each picture of the one or more groups has the same structure, i.e. is composed of a first set of images spatially arranged in a same manner in each picture. A projection is associated with each image of the first set, the projection being specific to the image it is associated with and different from an image to another one, the projections forming a second set of projections.

Each picture comprises for example one or more first images and potentially one or more second images. The data of the one or more first images are obtained by projecting at least a point of the point cloud according to the first projection associated with the considered one or more first images and retrieving the attributes of the projected points as data of the considered one or more first images. The data of the one or more second images correspond to data set by default, i.e. to determined data representative of default values. The default data is for example indicative of the absence of data obtained directly from the point cloud.

The one or more groups of temporally successive pictures are for example obtained from a storage device, for example a memory device of the apparatus 16 or a remote storage device such as a server. According to another example, the one or more groups are obtained by performing the process described hereinabove with regard to FIG. 8 to associate a different projection with each image and to spatially arrange all the projections/images within a picture.

In a second operation 102, first information representative of the projections of the second set is encoded. The encoded first information may be stored and/or transmitted in a bitstream 1001. The first information comprises for example a set of metadata, sub-sets of metadata describing each projection with for example a list of parameters and information representative of the location of each image within the picture (e.g. index representative of the picture column and picture row of a reference pixel of each image, the reference pixel being for instance the top left pixel or the bottom right pixel of each image).

The meta-data describing the projections may be based on an octree-based structure of projection. An octree-based structure of projection is an octree in which each parent node may comprise at most eight children nodes and in which a cube is associated with each of this node. A root node (depth 0) is the unique node without any parent node and each child node (depth greater than 0) has a single parent node.

A cube $C_j$ is attached to each node of the octree-based structure. The index j refers to the index of a cube of said octree-based structure of projection. Faces $F_{i,j}$ of cubes $C_j$ of an octree-based structure of projection are selected according to the orthogonal projections of the point cloud 111 onto these faces. The index i refers to the index of a face (1-6) attached to the cube.

An octree-based structure of projection may be obtained by splitting recursively an initial cube associated with the root node and encompassing the point cloud 111. Thus, an octree-based structure of projection comprises a set {$C_j$} of at least one cube $C_j$ associated with node(s). A stopping condition for the splitting process may be checked when a maximum octree depth is reached or when the size of a cube, associated with a node, is smaller than a threshold or when the number of points of the point cloud 111 included in the cube does not exceed a minimum number.

In the example illustrated on FIG. 19, the cube associated with the root node (depth 0) is split into 8 sub-cubes (depth 1) and two sub-cubes of depth 1 are then split into 8 sub-cubes (last depth=maximum depth=2), as illustrated with regard to the left-hand part of FIG. 5.

The meta-data of projection may thus contain:
information data (for example a flag) for each cube of the octree-based structure of projection, indicating whether a cube associated with a node is split or not,
and/or a face information data (for example 6 flags per cube) indicating which face(s) of a cube(s) is (are) used for the projection(s).

According to an embodiment, illustrated on FIG. 2, the node information data is a binary flag equal to 1 to indicate that a cube associated with a node is split and to 0 otherwise, and the face information data is a 6-bits data, each bit equals 1 to indicate that a face is used for a projection and 0 otherwise.

In a third operation 103, the point cloud is encoded by using the pictures obtained at operation 101. The point cloud is for example encoded by an encoder that is for example compliant with a legacy encoder such as JPEG, AVC, HEVC, or 3D-HEVC. According to a variant, the point cloud is encoded with the process of FIG. 2 or 3, the pictures obtained at operation 101 corresponding to the picture 201 at the input of the operation 20.

According to a specific embodiment, attributes are obtained, for each picture of the at least one group, by projecting points of the point cloud in at least an image of each picture according to the projection of the second set associated with the at least an image.

According to a further specific embodiment, the first information comprises:
projection parameters associated with the projections; and
information representative of a location of the images associated with the projections within the pictures.

According to a further specific embodiment, the first information is attached to an intra frame.

According to a further specific embodiment, for each picture of the at least one group, a second information is attached to each picture, the second information identifying at least one projection of the second set used to obtain attributes from the point cloud, the attributes being associated with at least an image of the first set comprised in each picture.

FIG. 11 shows an example of a process of generating pictures of one or more groups if pictures, in accordance with a non-limiting embodiment. The embodiment of FIG. 11 may for example correspond to the operation 101 of FIG. 10.

In a first operation 1101, a set of projections is selected. The selection consists in determining which projections will be used for representing the point cloud in a sequence of pictures, each picture of the sequence representing the point cloud at a different time t, the point cloud 111 being dynamic in the sense that it evolves with the time. The projections may correspond for example to the ones described with regard to FIGS. 5 and 6. The selection is performed for each picture of the one or more GOP, for example for each picture of an intra period. At the end of operation 1101, a list of projections is obtained, the list comprising a set of projections used to represent the point cloud during the whole intra period for example.

The selection of the projections may be performed according to a metric $Q(F_{i,j})$ representative of the capability of a projected (texture and/or depth) image associated with a face $F_{i,j}$ of a cube $C_j$ to efficiently compress the projection of the points, of the point cloud 111 which are included in the cube $C_j$, onto the face $F_{i,j}$.

The metric $Q(F_{i,j})$ may be responsive to the ratio of the total number N_total(i,j) of pixels, corresponding to the projection of the part of the point cloud 111 included in the cube $C_j$, over the number N_new(i,j) of newly seen points. A point is considered as being "newly seen" when the point has not been projected on a previously selected face. If no new point is seen by the projection of the part of the input colored point cloud onto a face $F_{i,j}$, said ratio becomes infinite. On the contrary, if all points are new, this ratio is equal to 1.

A face $F_{i,j}$ is selected when the metric $Q(F_{i,j})$ is lower than or equal to a threshold Q_acceptable:

$$Q(F_{i,j}) \leq Q\_acceptable$$

Then, none or at least one face may be selected per cube. The threshold Q_acceptable may be a given encoding parameter.

In a second operation 1102, each projection of the list obtained at operation 1101 is associated with an image, the set of images thus obtained forming a picture (either a picture with texture information or a picture with depth information or a picture comprising both texture and depth information). The arrangement of the images of the set is determined, for example such as optimizing the space within the picture, e.g. as described with regard to FIG. 8. The arrangement of the images is the same within each picture of the GOP or the intra period, only the data (i.e. texture and/or depth information) associated with the pixels of the images varying from a picture to another one. During operation 1102, a first information representative of each projection of the set of projections is generated. The first information may comprise:
metadata regarding the parameters of each projection;
information representative of the mapping between the set of projections and the set of images, one projection of the set being assigned to one image of the set; and/or
information representative of the location of each image within the picture (e.g. coordinates (for example column index and row index in the picture) of a reference pixel of each image).

The first information may be stored and/or transmitted in the bitstream 1001.

In a third operation 1103, the point cloud 111 is projected within the images of each picture of the GOP or the intra period according to the projections associated with said images to obtain the attributes to be assigned to the pixels of the images. Each picture represents the point cloud at a different time t and the projections used to represent the point cloud may vary from a picture to another one. A second information may be further generated during operation 1103 to signal which projections are used in a given picture of the GOP or intra period to represent the point cloud, for each picture. The second information may be generated for each picture and may comprise for example a list of projections (for example identified with an ID) performed for each picture to obtain the data/attributes of the so-called first image(s) of the picture. The second information may be stored and/or transmitted in the bitstream 1001 with the first information.

In a fourth operation 1104, the pictures of the GOP or intra period are generated by packing/gathering the images (with the attributes obtained for each picture at operation 1103) within the corresponding pictures, according to the first information that provides information about the location of the images within the picture with the mapping between the images and their associated projections.

The thus obtained pictures may then be encoded as described for example for the picture 201 regarding FIG. 2, 3 or 10.

FIG. 12 shows operations for decoding the encoded version of the point cloud 111 from the bitstream 112, according to a particular and non-limiting embodiment. The operations may be part of the decoding process 12 and may be implemented by the apparatus 16 of FIG. 16.

In an operation 121, encoded data of one or more pictures (e.g. pictures of one or more GOPs or of an intra period) of the point cloud is decoded by a decoder DEC2 from a received bitstream 112. The bitstream 112 comprises the encoded data of the one or more pictures. Each picture comprises a set of images, at least one of the images of the set comprising first attributes that correspond to at least a part of the data of the picture that has been encoded. Each image that comprises first attributes is called first image. The first attributes may be obtained by projecting, according to a first projection, a part of the point cloud in each first image, the first attributes corresponding to the attributes of the points of the part of the point cloud projected onto said each first image. The attributes, and consequently the first attributes, may correspond to texture (or color) information and/or depth (or distance to a view point) information. The set of images of the picture may also comprise one or more second images that do not comprise any attribute resulting from the projection of points of the point cloud. The data associated with each second image may for example correspond to default data, e.g. determined grey level for the texture information or a determined depth value for the depth information. The decoder DEC2 may correspond to the decoder DEC1 of FIG. 2 and is for example compliant with a legacy decoder such as:

JPEG,
AVC, also named MPEG-4 AVC or H264,
HEVC, or
3D-HEVC (an extension of HEVC).

The first attributes decoded at operation 121 are retrieved, for example stored in a buffer memory, for use in the generation of one or more reference pictures 1201, each reference picture being associated with one picture. In the following, only one reference picture associated with one picture will be considered for clarity and conciseness purposes.

In an operation 122 implemented by a module M122 (that may be identical to the module M22 of FIG. 2), each first image is de-projected according to the first projection associated with said each first image, i.e. the inverse operation of the first projection is performed, e.g. based on metadata comprising the parameters of the first projection. The de-projection of the decoded first attributes of the first images enable to obtain a three-dimensional (3D) representation of the point cloud, or part of it, represented in the picture.

In an operation 123 implemented by a module M123 (that may be identical to the module M23 of FIG. 2), second attributes are obtained from the 3D representation of the point cloud obtained at operation 122. Second attributes may for example be obtained for the second image(s) of the picture, i.e. for the images of the set of images of the picture that comprise default data and no attribute from the points of the point cloud. For each second image of the set of images of the picture, a set of second attributes may be obtained by projecting the points, or part of the points, of the 3D representation according to projection parameters of a second projection associated with said each second image. A specific second projection may be associated with each second image, each specific second projection being different from the first projection(s) associated with the first image(s) of the picture.

A reference picture 1201 (that may be identical to the reference picture 202 of FIG. 2) may be obtained from the picture by fusing the decoded first attributes obtained from the operation 121 with the second attributes obtained from the operation 123. The reference picture may comprise the same structure than the picture, i.e. the same spatial arrangement of the set of images but with different data, i.e. with the decoded first attributes and the obtained second attributes. A detailed description of an example of a process to obtain the reference picture is provided hereinabove with the description of FIG. 9.

The reference picture 1201 may be used in an operation 124, implemented by a module M124. The operation 124 comprises for example the generation of the predictors for inter prediction from the decoding of the encoded data comprised in the bitstream. These data, associated to the generation of the predictor, may comprise
  a prediction type, for instance a flag indicating if the prediction mode is intra or inter,
  a motion vector, and/or
  an index to indicate a reference picture from a list of reference pictures.

Naturally, a plurality of reference pictures may be obtained in a same way as the reference picture 1201, each reference picture of the plurality being obtained from decoded data of a specific picture representing the point cloud, the decoding of the data of the bitstream 112 may be based on one or several reference pictures to obtain a decoded point cloud 113.

According to a specific embodiment, attributes are obtained, for each picture of the at least one group, by projecting points of the point cloud in at least an image of each picture according to the projection of the second set associated with the at least an image.

According to a further specific embodiment, the first information comprises:
  projection parameters associated with the projections; and
  information representative of a location of the images associated with the projections within the pictures.

According to a further specific embodiment, the first information is attached to an intraframe.

According to a further specific embodiment, for each picture of the at least one group, a second information is attached to each picture, the second information identifying at least one projection of the second set used to obtain attributes from the point cloud, the attributes being associated with at least an image of the first set comprised in each picture.

FIG. 13 shows operations for decoding the encoded version of the point cloud 111 from the bitstream 112, according to a further particular and non-limiting embodiment. The embodiment of FIG. 13 may be considered as an alternative embodiment of the one of FIG. 12.

The operations 121, 122, 123 and 124 are the same as the embodiment of FIG. 12.

An operation 131 implemented by a module M131 (that may be identical to the module M31 of FIG. 3) is added. The operation 31 consists in fusing the 3D representation of the point cloud obtained during operation 122 with a complementary point cloud 1310, or with complementary part(s) of the point cloud. The complementary part(s) of the point cloud correspond for example to occluded part(s) of the point cloud that are not represented in the decoded picture(s). The complementary part(s) 1310 of the point cloud are for example represented with an octree, data representative of these complementary part being for example comprised in the bitstream 112.

An octree O comprises a root node, at least one leaf node and possibly intermediate nodes. A leaf node is a node of the octree O which has no child. All other nodes have children. Each node of an octree is associated with a cube. Thus, an octree O comprises a set $\{C_j\}$ of at least one cube $C_j$ associated with node(s). A leaf cube is a cube associated with a leaf node of an octree.

In the embodiment illustrated on FIG. 19, the cube associated with the root node (depth 0) is split into 8 sub-cubes (depth 1) and two sub-cubes of depth 1 are then split into 8 sub-cubes (last depth=maximum depth=2). The sizes of the cubes of a same depth are usually the same but the present embodiments are not limited to this example. A specific process may also determine different numbers of sub-cubes per depth, when a cube is split, and/or multiple sizes of cubes of a same depth or according to their depths.

The leaf cubes associated with the leaf nodes of the octree O may then include or not a point, preferably located at the center of the leaf cube, representative of at least a part of the point cloud 111.

Color values may be attached to each point included in a leaf cube of the octree O. The color values may be represented in an image OI, associated to the octree O, that associates the color of the pixels of the image OI to the color of the points included in the leaf cubes of the octree O. Said association may be obtained by a predetermined scanning order of the leaf nodes of the octree O and a predetermined scanning order of the pixels of the image OI. For example, the predetermined scanning order of the octree O may be a 3D recursive Hilbert path, and the predetermined scanning order of the image OI may be a raster-scan order.

Thus, a representation of an octree, representative of a part of a colored point cloud, may contain the following information
- a first set of flags indicating the splitting (or not) of a node into (eight) child nodes,
- a second set of flags indicating the presence (or not) of a point at the center of a leaf cube associated to a leaf node,
- a colored image OI, and/or
- scanning orders of the leaf cubes associated with the leaf nodes and of the pixels of the image OI.

Once completed, the 3D representation is projected according to one or more second projections to obtain the second attributes at operation 123.

FIG. 14 shows operations for decoding the encoded version of the point cloud 111 from the bitstream 1001, according to a further particular and non-limiting embodiment. The operations may be part of the decoding process 12 and may be implemented by the apparatus 16 of FIG. 16.

In a first operation 141, one or more temporally successive pictures are decoded from one or more received bitstreams 1001. The at least one received bitstream 1001 comprises encoded data of pictures of one or more GOPs, the pictures being representative of the point cloud (or at least a part of it) at diverse times. Each picture has the same structure, i.e. is composed of a first set of images spatially arranged in a same manner in each picture. A projection is associated with each image of the first set, the projection being specific to the image it is associated with and different from an image to another one, the projections forming a second set of projections.

Each picture comprises for example one or more first images and potentially one or more second images. The data of the one or more first images may have been obtained by projecting at least a point of the point cloud according to the first projection associated with the considered one or more first images and retrieving the attributes of the projected points as data of the considered one or more first images. The data of the one or more second images correspond to data set by default, i.e. to determined data representative of default values. The default data is for example indicative of the absence of data obtained directly from the point cloud.

In a second operation 142, first information representative of the projections of the second set is decoded. The decoded first information may be stored in a memory of the apparatus 16. The first information comprises for example a set of metadata, sub-sets of metadata describing each projection with for example a list of parameters and information representative of the location of each image within the picture (e.g. index representative of the picture column and picture row of a reference pixel of each image, the reference pixel being for instance the top left pixel or the bottom right pixel of each image).

The meta-data describing the projections may be based on an octree-based structure of projection. An octree-based structure of projection is an octree in which each parent node may comprise at most eight children nodes and in which a cube is associated with each of this node. A root node (depth 0) is the unique node without any parent node and each child node (depth greater than 0) has a single parent node.

A cube $C_j$ is attached to each node of the octree-based structure. The index j refers to the index of a cube of said octree-based structure of projection. Faces $F_{i,j}$ of cubes $C_j$ of an octree-based structure of projection are selected according to the orthogonal projections of the point cloud 111 onto these faces. The index i refers to the index of a face (1-6) attached to the cube.

An octree-based structure of projection may be obtained by splitting recursively an initial cube associated with the root node and encompassing the point cloud 111. Thus, an octree-based structure of projection comprises a set $\{C_j\}$ of at least one cube $C_j$ associated with node(s). A stopping condition for the splitting process may be checked when a maximum octree depth is reached or when the size of a cube, associated with a node, is smaller than a threshold or when the number of points of the point cloud 111 included in the cube does not exceed a minimum number.

In the embodiment illustrated on FIG. 19, the cube associated with the root node (depth 0) is split into 8 sub-cubes (depth 1) and two sub-cubes of depth 1 are then split into 8 sub-cubes (last depth=maximum depth=2).

The meta-data of projection may thus contain:
- information data (for example a flag) for each cube of the octree-based structure of projection, indicating whether a cube associated with a node is split or not,
- and/or a face information data (for example 6 flags per cube) indicating which face(s) of a cube(s) is (are) used for the projection(s).

According to an embodiment, illustrated on FIG. 2, the node information data is a binary flag equal to 1 to indicate that a cube associated with a node is split and to 0 otherwise, and the face information data is a 6-bits data, each bit equals 1 to indicate that a face is used for a projection and 0 otherwise.

In a third operation 143, the point cloud is decoded by using the decoded data of pictures obtained at operation 141. The point cloud is for example decoded by a decoder that is for example compliant with a legacy decoder such as JPEG, AVC, HEVC, or 3D-HEVC.

FIG. 15 shows an example of a decoding of the encoded point cloud from the bitstream 1001, in accordance with a further non-limiting embodiment.

In a first operation 151, encoded data comprised in the bitstream 1001 is decoded to obtain a sequence of temporally successive pictures forming one or more GOPs or an intra period. The encoded data is for example decoded by a decoder that is for example compliant with a legacy decoder such as JPEG, AVC, HEVC, or 3D-HEVC. According to a variant, a first and a second sequences of temporally successive pictures may be obtained, e.g. the first sequence corresponding to the pictures comprising the texture information and the second sequence corresponding to the pictures comprising the depth information.

In a second operation 152, the pictures obtained at operation 151 are each decoded to obtain sets of decoded images, each picture comprising a set of images. The decoding of operation 152 is based on first information that is for example received in the signal comprising the bitstream 1001. The first information comprises the list of projections associated with the one or more GOPs or with the intra period; information representative of the locations of the images within the pictures and information mapping each projection with an image. The first information is for example signaled with each I picture, i.e. at the beginning of the intra period.

In a third operation 153, the decoded images obtained at operation 152 are each de-projected to obtain a decoded dynamic point cloud, i.e. 3D representations of the point cloud at successive times. The de-projecting is based on second information that is for example received in the signal comprising the bitstream 1001 and the first information. The second information comprises a list of projections that have been used per picture, one specific list of projections being associated with each picture and forming a part of the list of projections of the intra period comprised in the first information. per picture being received. The de-projecting further uses the projection parameters/metadata associated with each projection and comprised in the first information. The second information is for example signaled with each picture of the intra period. According to a variant, the second information is signaled GOP by GOP, for example with each I and P pictures of the intra period.

FIG. 16 shows an example of an architecture of an apparatus 16 for implementing at least a part of the encoding/decoding scheme of FIG. 1, in accordance with a non-limiting embodiment. The apparatus 16 may be for example configured to implement at least a part of the operations described with regard to the FIGS. 2 to 15.

The apparatus 16 comprises following elements that are linked together by a data and address bus 161:
- a microprocessor 162 (or CPU), which is, for example, a DSP (or Digital Signal Processor);
- a ROM (or Read Only Memory) 163;
- a RAM (or Random-Access Memory) 164;
- a storage interface 165;
- an I/O interface 166 for reception of data to transmit, from an application; and
- a power supply, e.g. a battery.

In accordance with an example, the power supply is external to the device. In each of mentioned memory, the word «register» used in the specification can correspond to area of small capacity (some bits) or to very large area (e.g. a whole program or large amount of received or decoded data). The ROM 163 comprises at least a program and parameters. The ROM 163 may store algorithms and instructions to perform techniques in accordance with present embodiments. When switched on, the CPU 162 uploads the program in the RAM and executes the corresponding instructions.

The RAM 164 comprises, in a register, the program executed by the CPU 162 and uploaded after switching on of the apparatus 16, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the point cloud and associated data (e.g. depth and texture of the points of the point cloud) are obtained from a source. For example, the source belongs to a set comprising:
- a local memory (163 or 164), e.g. a video memory or a RAM (or Random-Access Memory), a flash memory, a ROM (or Read Only Memory), a hard disk;
- a storage interface (165), e.g. an interface with a mass storage, a RAM, a flash memory, a ROM, an optical disc or a magnetic support;
- a communication interface (166), e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

In accordance with examples of the decoding or decoder(s), the decoded point cloud or the reconstructed 3D representation of the point cloud is sent to a destination; specifically, the destination belongs to a set comprising:
- a local memory (163 or 164), e.g. a video memory or a RAM, a flash memory, a hard disk;
- a storage interface (165), e.g. an interface with a mass storage, a RAM, a flash memory, a ROM, an optical disc or a magnetic support; and
- a communication interface (166), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface).

In accordance with examples of encoding or encoder, the bitstream 112 and/or 1001 are sent to a destination. As an example, the bitstream is stored in a local or remote memory, e.g. a video memory (164) or a RAM (164), a hard disk (163). In a variant, the bitstream is sent to a storage interface (165), e.g. an interface with a mass storage, a flash memory, ROM, an optical disc or a magnetic support and/or transmitted over a communication interface (166), e.g. an interface to a point to point link, a communication bus, a point to multipoint link or a broadcast network.

In accordance with examples of decoding or decoder or renderer, the bitstream is obtained from a source. Exemplarily, the bitstream is read from a local memory, e.g. a video memory (164), a RAM (164), a ROM (163), a flash memory (163) or a hard disk (163). In a variant, the bitstream is received from a storage interface (165), e.g. an interface with a mass storage, a RAM, a ROM, a flash memory, an optical disc or a magnetic support and/or received from a communication interface (165), e.g. an interface to a point to point link, a bus, a point to multipoint link or a broadcast network.

In accordance with examples, the apparatus 16 is configured to implement a method described in relation with FIGS. 2 to 11, and belongs to a set comprising:
 a mobile device;
 a communication device;
 a game device;
 a tablet (or tablet computer);
 a laptop;
 a still picture camera;
 a video camera;
 an encoding chip;
 a server (e.g. a broadcast server, a video-on-demand server or a web server).

In accordance with examples, the apparatus 16 is configured to implement a decoding method described in relation with FIGS. 12-15, and belongs to a set comprising:
 a mobile device;
 a communication device;
 a game device;
 a set top box;
 a TV set;
 a tablet (or tablet computer);
 a laptop; and
 a display (such as a HMD for example).

In accordance with an embodiment illustrated in FIG. 17, in a transmission context between two remote devices 171 and 172 (of the type of the apparatus 16) over a communication network NET 170, the device 171 comprises means which are configured to implement a method for encoding data as described in relation with the FIGS. 2 to 11, and the device 172 comprises means which are configured to implement a decoding method as described in relation with FIGS. 12 to 15.

In accordance with an example, the network 170 is a LAN or WLAN network, adapted to broadcast still pictures or video pictures with associated audio information from device 171 to decoding/rendering devices including the device 172.

In accordance with a further example, the network is a broadcast network adapted to broadcast encoded point cloud(s) from device 171 to decoding devices including the device 172.

A signal, intended to be transmitted by the device 171, carries at least one of the bitstreams 112, 1001 with potentially the first and/or second information.

FIG. 18 shows an embodiment of the syntax of such a signal transmitted for example between two remote devices 171 and 172 when the data are transmitted over a packet-based transmission protocol. Each transmitted packet P comprises a header H and payload data PAYLOAD.

According to embodiments, the payload PAYLOAD may comprise at least one of the following elements:
 bits that represent at least one picture representing the point cloud at a determined time t, e.g. the bits may represent texture information and/or depth information associated with the pixels of the at least one picture;
 bits that represent the location of images within the at least one picture;
 bits that represent projection information data and the mapping between the projections and the images of the at least one picture;
 bits that enable to identify which projections are used in the at least one picture to obtain attributes (i.e. texture information and/or depth information) for pixels of one or more images of the at least one picture.

According to a specific embodiment, the signal further carries on a second information associated with the at least one picture, the second information identifying at least one projection of the set of projections used to obtain attributes from the point cloud, the attributes being associated with at least an image comprised in the at least one picture.

Naturally, the present disclosure is not limited to the embodiments previously described.

The present disclosure is not limited to a method of encoding and/or decoding a point cloud but also extends to a method and device for transmitting the bitstream obtained by the encoding of the point cloud and/or a method and device for receiving the bitstream obtained by the encoding of the point cloud. The present disclosure also extends to a method and device for rendering and/or displaying the decoded point cloud, i.e. images of the 3D object represented by the decoded point cloud, a point of view being associated with each image.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, a HMD (Head-Mounted Display), smart glasses and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a point cloud representing a three-dimensional object, the method comprising:
  obtaining at least one group of temporally successive pictures of said point cloud, each picture of said at least one group comprising at least a first set of images, the images of said first set of images having a same location in each picture of said at least one group, a set of projections being associated with said at least one group, a different projection of the set of projections being associated with each image of said first set of images, the same projection being associated with images of said first set of images in the temporally successive pictures that are in the same location;
  encoding a first information representative of the projections of the set of projections; and
  encoding said point cloud according to the obtained pictures.

2. An apparatus adapted to encode a point cloud representing a three-dimensional object, the apparatus comprising a memory associated with a processor configured to:
  obtain at least one group of temporally successive pictures of said point cloud, each picture of said at least one group comprising at least a first set of images, the images of said first set having a same location in each picture of said at least one group, a set of projections being associated with said at least one group, a different projection of the set of projections being associated with each image of said first set of images, the same projection being associated with images of said first set of images in the temporally successive pictures that are in the same location;
  encode a first information representative of the projections of the set of projections; and
  encode said point cloud according to the obtained pictures.

3. The method according to claim 1, wherein attributes are obtained, for each picture of said at least one group, by projecting points of said point cloud in at least an image of said each picture according to the projection of the set of projections associated with said at least an image.

4. The method according to claim 1, wherein said first information comprises:
  projection parameters associated with said projections; and
  information representative of a location of the images associated with the projections within the pictures.

5. The method according to claim 1, wherein said first information is attached to an intra frame.

6. The method according to claim 1, wherein, for each picture of said at least one group, a second information is attached to said each picture, said second information identifying at least one projection of the set of projections used to obtain attributes from the point cloud, said attributes being associated with at least an image of the first set of images comprised in said each picture.

7. A method of decoding a point cloud representing a three-dimensional object from at least one bitstream, the method comprising:
  obtaining said at least one bitstream that comprises encoded data of at least one group of temporally successive pictures of said point cloud, each picture of said at least one group comprising at least a first set of images, the images of said first set of images having a same location in each picture of said at least one group,
  decoding said at least one group of temporally successive pictures from said at least one bitstream;
  decoding a first information representative of a set of projections, said set of projections being associated with said at least one group of temporally successive pictures, a different projection of the set of projections being associated with each image of said first set of images, the same projection being associated with images of said first set of images in the temporally successive pictures that are in the same location; and
  decoding said point cloud according to the decoded pictures.

8. An apparatus adapted to decode a point cloud representing a three-dimensional object, the apparatus comprising a memory associated with a processor configured to:
obtain said at least one bitstream that comprises encoded data of at least one group of temporally successive pictures of said point cloud, each picture of said at least one group comprising at least a first set of images, the images of said first set of images having a same location in each picture of said at least one group,
decode said at least one group of temporally successive pictures from said at least one bitstream;
decode a first information representative of a set of projections, said set of projections being associated with said at least one group of temporally successive pictures, a different projection of the set of projections being associated with each image of said first set of images, the same projection being associated with images of said first set of images in the temporally successive pictures that are in the same location; and
decode said point cloud according to the decoded pictures.

9. The method according to claim 7, wherein attributes are obtained, for each picture of said at least one group, by projecting points of said point cloud in at least an image of said each picture according to the projection of the set of projections associated with said at least an image.

10. The method according to claim 7, wherein said first information comprises:
projection parameters associated with said projections; and
information representative of a location of the images associated with the projections within the pictures.

11. The method according to claim 7, wherein said first information is attached to an intra frame.

12. The method according to claim 7, wherein, for each picture of said at least one group, a second information is attached to said each picture, said second information identifying at least one projection of the set of projections used to obtain attributes from the point cloud, said attributes being associated with at least an image of the first set of images comprised in said each picture.

13. A non-transitory computer readable medium having stored therein data representative of at least one picture of at least one group of temporally successive pictures of a point cloud, each picture of said at least one group comprising at least a first set of images, said images of said first set having a same location in each picture of said at least one group, the signal further carrying on a first information representative of a set of projections, said projections being associated with said at least one group of temporally successive pictures, a different projection being associated with each image of said first set of images, the same projection being associated with images of said first set of images in the temporally successive pictures that are in the same location.

14. The non-transitory computer readable medium according to claim 13, further carrying on a second information associated with said at least one picture, said second information identifying at least one projection of the set of projections used to obtain attributes from the point cloud, said attributes being associated with at least an image comprised in said at least one picture.

15. A non-transitory processor readable medium having stored therein instructions for causing a processor to perform the method according to claim 1.

16. The apparatus according to claim 2, wherein attributes are obtained, for each picture of said at least one group, by projecting points of said point cloud in at least an image of said each picture according to the projection of the set of projections associated with said at least an image.

17. The apparatus according to claim 2, wherein said first information comprises:
projection parameters associated with said projections; and
information representative of a location of the images associated with the projections within the pictures.

18. The apparatus according to claim 2, wherein said first information is attached to an intra frame.

19. The apparatus according to claim 2, wherein, for each picture of said at least one group, a second information is attached to said each picture, said second information identifying at least one projection of the set of projections used to obtain attributes from the point cloud, said attributes being associated with at least an image of the first set of images comprised in said each picture.

20. The apparatus according to claim 8, wherein attributes are obtained, for each picture of said at least one group, by projecting points of said point cloud in at least an image of said each picture according to the projection of the set of projections associated with said at least an image.

21. The apparatus according to claim 8, wherein said first information comprises:
projection parameters associated with said projections; and
information representative of a location of the images associated with the projections within the pictures.

22. The apparatus according to claim 8, wherein said first information is attached to an intra frame.

23. The apparatus according to claim 8, wherein, for each picture of said at least one group, a second information is attached to said each picture, said second information identifying at least one projection of the set of projections used to obtain attributes from the point cloud, said attributes being associated with at least an image of the first set of images comprised in said each picture.

24. A non-transitory processor readable medium having stored therein instructions for causing a processor to perform the method according to claim 9.

* * * * *